(12) United States Patent
McClusky et al.

(10) Patent No.: US 11,762,916 B1
(45) Date of Patent: Sep. 19, 2023

(54) USER INTERFACE FOR IDENTIFYING UNMET TECHNICAL NEEDS AND/OR TECHNICAL PROBLEMS

(71) Applicant: Artemis Intelligence LLC, Lakewood, OH (US)

(72) Inventors: Mark Daniel McClusky, Rocky River, OH (US); Matthew Donald McClusky, Westlake, OH (US); Emily Elizabeth McClusky, Westlake, OH (US); Jonathan Nathaniel Fegely, Lakewood, OH (US); Jonathan Hilton Evans, Seattle, WA (US)

(73) Assignee: Artemis Intelligence LLC, Lakewood, OH (US)

( * ) Notice: Subject to any disclaimer, the term of this patent is extended or adjusted under 35 U.S.C. 154(b) by 0 days.

(21) Appl. No.: 17/404,702

(22) Filed: Aug. 17, 2021

Related U.S. Application Data

(60) Provisional application No. 63/066,553, filed on Aug. 17, 2020.

(51) Int. Cl.
*G06F 16/9038* (2019.01)
*G06F 16/2457* (2019.01)
(Continued)

(52) U.S. Cl.
CPC .... *G06F 16/9038* (2019.01); *G06F 16/24578* (2019.01); *G06F 16/90328* (2019.01); *G06F 16/93* (2019.01)

(58) Field of Classification Search
CPC .... G06F 16/9038; G06F 16/248; G06F 16/93; G06F 16/24578; G06F 16/2457;
(Continued)

(56) References Cited

U.S. PATENT DOCUMENTS 5,371,673 A  12/1994  Fan
5,907,840 A   5/1999  Evans
(Continued)

FOREIGN PATENT DOCUMENTS

WO  2002037447  5/2002
WO  2011025162  3/2011

OTHER PUBLICATIONS

Charles, M. (2011). Adverbials of result: Phraseology and functions in the problem-solution pattern. Journal of English for Academic Purposes, 10(1), 47-60.
(Continued)

*Primary Examiner* — Hau H Hoang
(74) *Attorney, Agent, or Firm* — Calfee, Halter & Griswold LLP

(57) ABSTRACT

Systems and methods described herein comprise a user interface for searching, analyzing, and interpreting documents obtained from computer databases. Exemplary systems and methods receive a user input and automatically identify, analyze, and interpret unmet technical needs and/or technical problems in specific areas of technology based on that input. Other exemplary systems and methods automatically identify, analyze, and interpret unmet technical needs and/or technical problems across numerous areas of technology based on similar user input. Other exemplary systems and methods receive user input and automatically identify, analyze, and interpret documents associated with a company to determine one or more technical capabilities of that company.

19 Claims, 33 Drawing Sheets

(51) Int. Cl.
*G06F 16/9032* (2019.01)
*G06F 16/93* (2019.01)

(58) Field of Classification Search
CPC .... G06F 16/245; G06F 16/9032; G06F 40/30; G06N 5/022; G06N 5/02
See application file for complete search history.

(56) References Cited

U.S. PATENT DOCUMENTS

| | | | |
|---|---|---|---|
| 6,078,914 | A | 6/2000 | Redfern |
| 6,088,692 | A | 7/2000 | Driscoll |
| 6,473,730 | B1 | 10/2002 | McKeown |
| 7,386,535 | B1 | 6/2008 | Kalucha et al. |
| 7,505,964 | B2 | 3/2009 | Tong et al. |
| 7,599,922 | B1 | 10/2009 | Chen et al. |
| 7,739,104 | B2 | 6/2010 | Berkan et al. |
| 7,752,204 | B2 | 7/2010 | Kao et al. |
| 8,037,062 | B2 | 10/2011 | Baris et al. |
| 8,086,601 | B2 | 12/2011 | Kim et al. |
| 8,126,883 | B2 | 2/2012 | Qiu |
| 8,145,617 | B1 | 3/2012 | Verstak et al. |
| 8,438,142 | B2 | 5/2013 | Wu et al. |
| 8,442,972 | B2 | 5/2013 | Ismalon |
| 8,589,373 | B2 | 11/2013 | Mayer |
| 8,606,796 | B2 | 12/2013 | Martin et al. |
| 8,631,001 | B2 | 1/2014 | Lawrence et al. |
| 8,650,186 | B2 | 2/2014 | Beck et al. |
| 8,700,620 | B1 | 4/2014 | Lieberman |
| 8,825,515 | B1 | 9/2014 | Hanson |
| 8,874,569 | B2 | 10/2014 | Miller et al. |
| 8,909,627 | B1 | 12/2014 | Popovici et al. |
| 8,965,882 | B1 | 2/2015 | Popovici et al. |
| 8,965,904 | B2 | 2/2015 | Dinh et al. |
| 8,977,953 | B1 | 3/2015 | Pierre et al. |
| 9,058,394 | B2 | 6/2015 | Franks et al. |
| 9,177,319 | B1 | 11/2015 | Chheda |
| 9,542,259 | B1 | 1/2017 | McEwen |
| 10,331,681 | B1 | 6/2019 | Chen et al. |
| 10,438,212 | B1 | 10/2019 | Jilani |
| 2003/0115191 | A1 | 6/2003 | Copperman et al. |
| 2003/0130837 | A1 | 7/2003 | Batchilo et al. |
| 2006/0053098 | A1 | 3/2006 | Gardner et al. |
| 2006/0265646 | A1 | 11/2006 | Girolami Rose |
| 2008/0098300 | A1 | 4/2008 | Corrales et al. |
| 2009/0150827 | A1 | 6/2009 | Meyer et al. |
| 2009/0240685 | A1 | 9/2009 | Costello et al. |
| 2012/0265744 | A1* | 10/2012 | Berkowitz ......... G06Q 30/0613 707/705 |
| 2014/0201203 | A1 | 7/2014 | Krishna et al. |
| 2014/0358890 | A1 | 12/2014 | Chen et al. |
| 2015/0294017 | A1 | 10/2015 | Zhang |
| 2015/0356270 | A1 | 12/2015 | Devarakonda |
| 2016/0239487 | A1 | 8/2016 | Potharaju |
| 2016/0301771 | A1 | 10/2016 | Choudhari |
| 2017/0004205 | A1 | 1/2017 | Jain |

OTHER PUBLICATIONS

Citrine IO Feb. 2018, Data Is the Future of Materials; Sep. 18, 2013.
Citrine IO Overview, Feb. 2017, AI-Powered Materials Informatics Accelerating the Global 1000, Citrine Selected Into the 2017 A1100 By CBInsights; Jan. 11, 2017.
Citrine IO Overview, TomKat Center For Sustainable Energy, Stanford University, Citrine Informatics, (date unknown).
Citrine lends support to US government's Materials Data Challenge, Citrine Informatics, Jul. 7, 2015.
Flowerdew, L. (2008). Corpus-based analyses of the problem-solution pattern: A phraseological approach (vol. 29). Amsterdam: John Benjamins Publishing.
Gelbukh et al.—Combining Sources of Evidence for Recognition of Relevant Passages in Texts; Advanced Distributed Systems; vol. 3563 of the series Lecture Notes in Computer Science; pp. 283-290 (2005).
Getting Inspired by Unusual Relevant Sources; TRIZ & Patent Inspiration: New Insights, Inspiration and Ideas; Gijs Bakker & Gertjan, Otto Jun. 22, 2016.
Gupta et al.—Document Summarization Based on Sentence Ranking Using Vector Space Model; International Journal of Data Mining, Modelling and Management; vol. 5; Issue: 4; DOI: 10.1504/IJDMMM.2013.057680 (2013).
Heffernan-Teufel, Apr. 6, 2018; Identifying Problems and Solutions In Scientific Text.
Jayabharathy et al.—Multi-Document Summarization Based on Sentence Features and Frequent Item Sets; Advances in Computer Science, Engineering & Applications; vol. 166 of the series Advances in Intelligent and Soft Computing; pp. 657-671 (2012) (abstract only).
Kasey's Blog, "Using Data Science to Drive Innoviation," available at http://newrycorp.com/blog/data-science-to-drive-innovation, from Mar. 8, 2017.
Kaszkiel et al.—Efficient Passage Ranking for Document Databases, Sep. 1999 ACM Transactions on Information Systems (TOIS); Oct. 1999; vol. 17; Issue: 4.
Lee, et al.—Document Ranking and the Vector-Space Model, Software, IEEE; 1997; vol. 14; Issue: 2; pp. 67-75, DOI: 10.1109/52.582976.
Liu et al.—An Extractive Text Summarizer Based on Significant Words; Computer Processing of Oriental Languages. Language Technology for the Knowledge-based Economy; vol. 5459 of the series Lecture Notes in Computer Science; pp. 168-178 (2009) (abstract only).
Medlock, B., & Briscoe, T. (2007). Weakly supervised learning for hedge classification in scientific literature. ACL, Citeseer, 2007, 992-999.
Mohamad ali, Afida. (2007). Semantic fields of problem in business English: Malaysian and British journalistic business texts. Corpora. 2. 211-239. 10.3366/cor.2007.2.2.211.
Patent Inspiration Components, Accessed Between Apr. 27 and May 3, 2018.
Patent Inspiration Problems, Accessed Between Apr. 27 and May 3, 2018.
Patent Inspiration, Jun. 15, 2018.
Resolute Innovation Oct. 2017, Connect Your Company With Emerging Technology; Jun. 20, 2015.
Resolute Innovation, Connect Your Company With Emerging Technology, Feb. 25, 2017.
Resolute Innovation, Predict Every Future Product and Threat Long Before Its Commercialization With Cutting-Edge Artificial Intelligence; Dec. 22, 2017.
Scott, M. (2001). Mapping key words to problem and solution. In Patterns of text: In honour of Michael Hoey Benjamins, Amsterdam (pp. 109-127).
Shaping Tomorrows Breakthrough Materials; Stanford Graduate School of Business, Jun. 22, 2015.
Shneiderman—Dynamic Queries for Visual Information Seeking, Software, IEEE; 1994; vol. 11; Issue: 6 pp. 70-77; DOI: 10.1109/52.329404.
Wu et al.—Towards a Highly-Scalable and Effective Metasearch Engine; Proceedings of the 10th international conference on World Wide Web; Mar. 2001.
Non-Final Office Action for U.S. Appl. No. 15/488,675; dated Dec. 20, 2018.
Non-Final Office Action for U.S. Appl. No. 15/488,675; dated Feb. 3, 2020.
Final Office Action for U.S. Appl. No. 15/488,675; dated Jul. 15, 2019.
Final Office Action for U.S. Appl. No. 15/488,675; dated Nov. 3, 2020.
Non-Final Office Action for U.S. Appl. No. 15/488,675; dated Jun. 9, 2021.
Final Office Action for U.S. Appl. No. 15/488,675; dated Oct. 7, 2021.
Restriction Requirement for U.S. Appl. No. 15/953,606 dated Mar. 26, 2021.
Office Action for U.S. Appl. No. 15/953,606 dated Jul. 9, 2021.
Office Action for U.S. Appl. No. 17/853,160 dated May 23, 2023.

(56) References Cited

OTHER PUBLICATIONS

Office Action for U.S. Appl. No. 17/865,639 dated Apr. 27, 2023.

\* cited by examiner

USER INTERFACE FOR IDENTIFYING UNMET TECHNICAL NEEDS AND/OR TECHNICAL PROBLEMS

CROSS-REFERENCE TO RELATED APPLICATIONS

This application claims priority to, and any other benefit of, U.S. Provisional Patent Application Ser. No. 63/066,553, having the same title and filed Aug. 17, 2020, the entire contents of which are incorporated herein by reference. This application is also related to U.S. patent application Ser. No. 15/953,606, entitled "SYSTEMS AND METHODS FOR AUTOMATICALLY IDENTIFYING UNMET TECHNICAL NEEDS AND/OR TECHNICAL PROBLEMS" and filed Apr. 16, 2018 ("the '606 Application"), the entire contents of which are incorporated herein by reference, to the extent that they are not directly conflicting with the present application.

BACKGROUND

The present disclosure generally relates to the field of computer databases and searching, analyzing, and interpreting documents obtained from computer databases and the user interfaces that facilitate their use. Exemplary systems and methods receive a user input and automatically identify, analyze, and interpret unmet technical needs and/or technical problems in specific areas of technology based on that input. Other exemplary systems and methods automatically identify, analyze, and interpret unmet technical needs and/or technical problems across numerous areas of technology based on similar user input. Other exemplary systems and methods receive user input and automatically identify, analyze, and interpret documents associated with a company to determine one or more technical capabilities of that company.

Some businesses thrive by being able to identify unmet customer needs and meet those needs. A promising technology might languish because a quintessential application for that technology has never been identified and/or matched to the promising technology. Identifying an application for that promising technology potentially makes that technology very valuable. As another example, some previously successful technologies can find new application (and perhaps profitable application) if a previously unmet need is identified and matched to that technology. Applicants can bridge the gap between a "technology push" and a "market pull" by intentionally identifying unmet customer needs in a specific technical area and matching available technologies with the unmet needs.

The task of identifying unmet customer needs in a specific technical area can be daunting, especially given the pace of innovation and myriad of complex technical systems in the world. Such tasks can often seem like searching for a needle in a haystack of innumerable documents, web pages, market reports, rumors, potential customer conversations, etc. Furthermore, distinguishing which problems are most important and valuable for the marketplace to solve and that also have the highest addressability for an organization or technology can be extremely difficult and resource-intensive. Thus, the present application provides technological solutions that overcome problems specifically arising in the realm of computer databases and networks: the shear multitude of documents and volume of text available on the Internet, third-party document portals, internal company document databases, etc. makes conducting ordinary search and analysis of such problems frustrating at best and completely useless at worst.

It is appreciated that there is a need for user interfaces for accepting user input and applying advanced computer intelligence in searching documents to identify unmet technical needs and/or technical problems and their associated opportunities for new solutions.

SUMMARY

The present disclosure generally relates to the field of computer databases and searching, analyzing, and interpreting documents obtained from computer databases. In an exemplary embodiment, a computer implemented method of analyzing documents is provided. The method comprising: receiving an input from a user via a user interface; associating the input with a technological field; generating one or more suggested terms associated with the technological field, wherein the one or more suggested terms are based on technological concepts related to the technological field; displaying the one or more suggested terms at the user interface; receiving a selection of the one or more suggested terms; and, analyzing documents in a document database to identify documents having one or more technology elements based on the input, the technological field associated with the input, and the selection of the one or more suggested terms.

BRIEF DESCRIPTION OF THE DRAWINGS

The present disclosure generally relates to the field of computer databases and searching, analyzing, and interpreting documents obtained from computer databases.

FIG. 26 illustrates sorting in an exemplary user interface;

FIGS. 27A-B illustrate a problem profile view in an exemplary user interface;

DETAILED DESCRIPTION

This Detailed Description merely describes exemplary embodiments of the invention and is not intended to limit the scope of the claims in any way. Indeed, the invention as claimed is broader than the exemplary embodiments, and the terms used in the claims have their full ordinary meaning, unless an express definition is provided herein.

The systems and methods described herein relate to an exemplary user interface comprising various data analysis tools for identifying unmet technical needs and/or technical problems. In certain embodiments, the user interface is capable of identifying and analyzing technical capabilities of a user. According to various exemplary embodiments, a user can interact with a user interface to conduct certain data analysis tasks via systems and methods associated with the user interface, e.g., as taught in the '606 Application (which is incorporated herein, in its entirety). These tasks may be performed automatically and/or in response to user input (e.g., parameters, search terms, search histories, etc.) as taught in the '606 Application. It is appreciated that an exemplary user interface (and/or associated systems and methods for identifying unmet technical needs and/or technical problems) may be implemented using various configurations of computer hardware and/or software configured to perform operations, e.g., as taught in the '606 Application.

Figure 1:
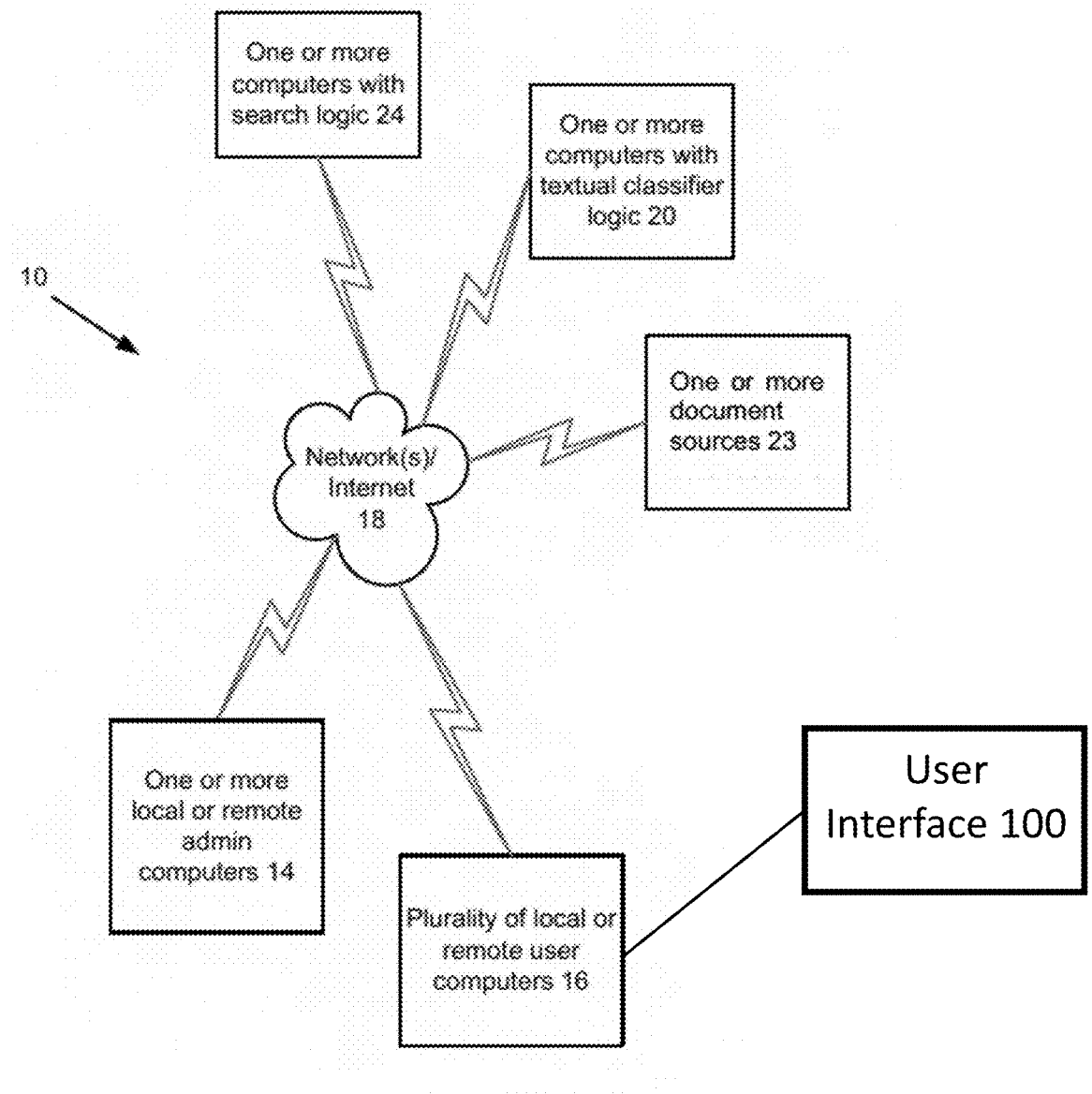
FIG. 1 is a schematic block diagram of an exemplary system.
Figure 2:
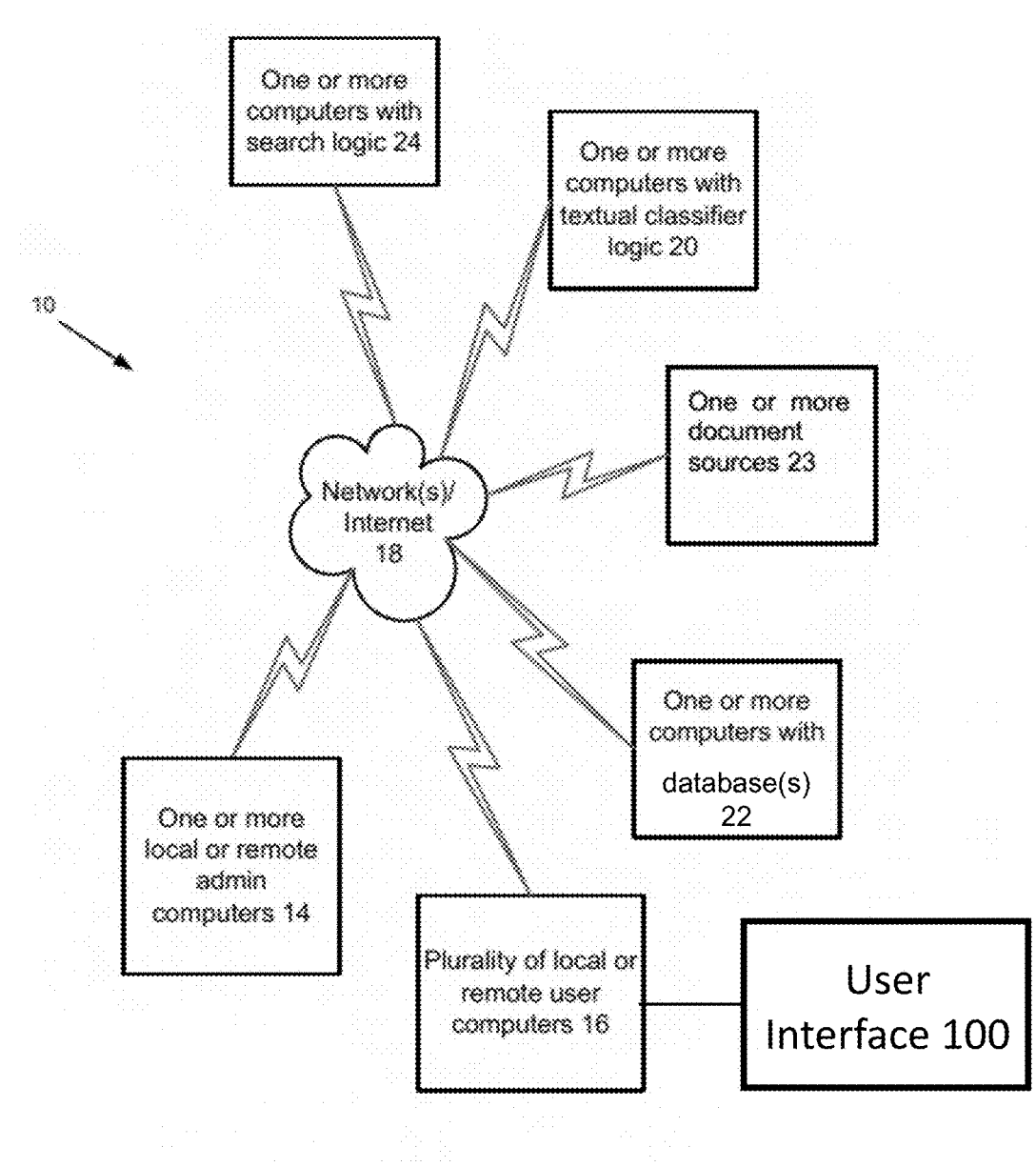
FIG. 2 is another schematic block diagram of the exemplary system of FIG. 1.

Referring now to FIG. 1 and FIG. 2, block diagrams of an exemplary system 10 are shown. Exemplary system 10 provides users with a user interface 100 for identifying unmet technical needs, technical problems, and/or technical capabilities. System 10 includes one or more local or remote admin computers 14 in communication with a plurality of local or remote user computers 16, via one or more wired or wireless communication networks 18, e.g., the Internet. The user computers 16 are also in communication with one or more computers with deficiency recognizer logic 20, and one or more computers with search logic 24, and perhaps one or more document sources 23. The term "document" as used herein is intended to broadly include any piece of written, printed, or electronic matter that provides information or evidence or that serves as an official record and includes writings, drawings, graphs, charts, photographs, sound recordings, images, and other data or data compilations stored in any medium from which information can be obtained. Exemplary documents include patents, patent applications, technical papers or journal articles, news articles, web pages, Facebook posts, Instagram posts, Twitter tweets, company annual reports or financial disclosure forms, product reviews, press releases, market reports, PowerPoint presentations, conference proceedings or presentations, earnings calls, product specification sheets, product announcements, blog posts, whitepapers, etc. The search logic 24 analyzes documents to identify unmet technical needs and/or technical problems, as discussed herein. For example, in exemplary embodiments, a plurality of documents are analyzed and each is scored based on technical elements within or proximate text having a desired textual tone (interpreted as negative or positive or either tone), in that document or each subset of the document (the terms subset of a document and portion of a document as used herein mean a contiguous portion of less than the whole document, such as the paragraph, a sentence, a clause, or a phrase) or a number of sequential subsets of the document (and perhaps their proximity). In some exemplary embodiments, documents or document subsets or associated features of those documents or document subsets with the highest score are then displayed at user interface 100.

The computers 14, 16, 20, 24 have logic for performing the various functions and processes described herein. "Computer" or "processor" as used herein includes, but is not limited to, any programmed or programmable electronic device or coordinated devices that can store, retrieve, and process data and may be a processing unit or in a distributed processing configuration. Examples of processors include microprocessors, microcontrollers, graphics processing units (GPUs), floating point units (FPUs), tensor processing unit (TPU), reduced instruction set computing (RISC) processors, digital signal processors (DSPs), field programmable gate arrays (FPGAs), etc. Computers and processors may be located locally or remotely, e.g., in the cloud. "Logic," synonymous with "circuit" as used herein includes, but is not limited to, hardware, firmware, software and/or combinations of each to perform one or more functions or actions. For example, based on a desired application or needs, logic may include a software controlled processor, discrete logic such as an application specific integrated circuit (ASIC), programmed logic device, or other processor. Logic may also be fully embodied as software. "Software," as used herein, includes but is not limited to one or more computer readable and/or executable instructions that cause a processor or other electronic device to perform functions, actions, processes, and/or behave in a desired manner. The instructions may be embodied in various forms such as routines, algorithms, modules or programs including separate applications or code from dynamically linked libraries (DLLs). Software may also be implemented in various forms such as a stand-alone program, a web-based program, a function call, a subroutine, a servlet, an application, an app, an applet (e.g., a Java applet), a plug-in, instructions stored in a memory, part of an operating system, or other type of executable instructions or interpreted instructions from which executable instructions are created. It will be appreciated by one of ordinary skill in the art that the form of software is dependent on, for example, requirements of a desired application, the environment it runs on, and/or the desires of a designer/programmer or the like.

In some exemplary embodiments, the computers 14, 20, 24 are all implemented on a single computer (and accessed by separate remote user computers 16 via user interface 100). In some embodiments, the computers 14, 16, 20, 24 are all implemented on a single computer. Any one or any two or more of the computers 14, 16, 20, 24 can be implemented on the same computer. All of the computers 14, 16, 20, 24 can be implemented on one or more separate computers. Virtually any of the computers can be implemented in the cloud. It is appreciated that computers 16 and their interaction with computers 14, 20, 22, 23, and 24 may be facilitated though user interface 100, which in certain embodiments, may be in separate communication with other computers (e.g., computers 14, 20, 22, 23, and 24).

In some embodiments, the software used by the computers 14, 16, 20, 24 to perform the various functions and processes herein is stored on one or more data storage devices local to those computers. As used herein, "data storage device" (synonymous with "memory") means a device for non-transitory storage of code or data, e.g., a device with a non-transitory computer readable medium. As used herein, "non-transitory computer readable medium" mean any suitable non-transitory computer readable medium for storing code or data, such as a magnetic medium, e.g., fixed disks in external hard drives, fixed disks in internal hard drives, and flexible disks; an optical medium, e.g., CD disk, DVD disk, and other media, e.g., ROM, PROM, EPROM, EEPROM, flash PROM, external flash memory drives, etc. In some embodiments, computers 14, 16, 20, 24 (and the other computers herein) communicate with each other via network 18 utilizing, for example, a web browser or other client software stored in memory accessible by the computers 14, 16, 20, 24. For example, in some exemplary embodiments, admin computers 14 include client software specifically utilized for communication with computers 20, 24. Likewise, in some exemplary embodiments, user computers 16 have access to software that is utilized to communicate with computers 20, 24 via network 18.

FIG. 2 adds one or more computers with database(s) 22, for example, materials database(s), technical system/component database(s), process database(s), characteristic database(s), concept database(s), and ontology databases. It is appreciated that the various databases described herein may exist as separately configured databases and/or as a collection of structured data on one or more aggregate databases on the one or more computers with database(s) 22. It is appreciated that in some embodiments, the computers 14, 16, 20, 24 are all implemented on a single computer. Any one or any two or more of the computers 14, 16, 20, 24 can be implemented on the same computer. All of the computers 14, 16, 20, 24 can be implemented on one or more separate computers.

Identifying Unmet Technical Needs and/or Technical Problems

Identifying Problem Kernels

In some exemplary embodiments, the various systems and methods identify technical needs and/or technical problems using textual analysis of documents. In some exemplary embodiments, the systems and/or methods identify "problem kernels" in such documents, or specific portions of text in documents that described or likely describe a technical problem or unmet technical need. The term "problem kernel" refers to at least one subset of a document that describes a technical deficiency, technical requirement, or unmet technical need. The term "subset of a document" refers to a clause, phrase, sentence, paragraph, or group of two or more consecutive clauses, phrases, sentences, or paragraphs. Herein the term "n-gram" refers to the set of all sequential characters or words found in text for a given value of n. For example, within "word" there are two 3-character grams: 'wor' and 'ord'. The term "automatically" as used herein is intended to broadly include any programming, algorithm, logic, or processor that performs one or more steps in a process on a plurality of documents with little or no direct human control.

In some exemplary embodiments, documents are analyzed using a type of textual classifier referred to herein as a Deficiency Recognizer to identify sections (e.g., clauses, phrases, sentences, groups of sentences, paragraphs, groups of paragraphs, etc.) of the document that include words that might indicate a technical deficiency (an example of "problem kernels"). In some exemplary embodiments, textual classifier logic 20 (also referred to herein as deficiency recognizer logic) uses algorithms to analyze both the words and the structure of the section of the document to identify possible problem kernels. In some exemplary embodiments, systems or methods automatically identify problem kernels leveraging various computer models and algorithms. For example, in some exemplary embodiments, labeled training data consisting of portions of text that indicate or describe a technical problem (e.g., words, word n-grams, phrases, sentences, paragraphs, etc.) and other portions of text that do not is provided to a variety of computer algorithms, potentially including but not limited to machine learning classifiers, such as probabilistic classifiers, e.g., Maximum Entropy Classifier, Naive Bayes Classifier, or Neural Networks, e.g., Probabilistic Neural Networks (PNN), Recurrent Neural Networks, or Convolutional Neural Networks (CNN) to create various predictive models. Alternatively, in the absence of labeled text, natural language processing algorithms such as TF-IDF, singular value decomposition, Word2Vec or other natural language transformations, can be used to rate the probability that a portion of text describes a technical problem based on similarity or co-occurrence of previously identified "problem words" or "problem sentences" with the portion of the text. For example, the cosine similarity between previously trained word, word n-gram, sentence, or paragraph vectors using, for example, Word2Vec, Glove, FastText, Sentence2Vec, or Paragraph2Vec processes to generate the vectors for "problem words" or "problem sentences" or "problem paragraphs," and vectors for unclassified portions of text can be calculated to score the probability that a portion of the text references a problem. In exemplary embodiments, the output of at least one of these natural language processing algorithms is used to create initial training data. Word or character n-gram vectors can also be created, if they were not created with the training data, and used to encode input for the classifier, as described above, to create a model. In some embodiments, a single Neural Network classifier, e.g., a CNN, is used to both encode the word or character n-gram vectors and perform the classification. In exemplary embodiments, such models are used to predict which other, unlabeled portions of text also have a high probability of indicating and describing a technical problem and which do not. In some exemplary embodiments, such predictions are then evaluated and accepted or refined based on various methods, including but not limited to meeting quantitative thresholds based on the estimated probability of the text indicating a technical problem from a single model, the correlation of such probabilities across multiple diverse models, human evaluation, using active learning to generate a set of portions of text the classifier is least certain about for further human evaluation (e.g., uncertainty sampling), etc. Text with predictions of their likely presence or non-presence of technical problems that meet various threshold criteria is then labeled as such and stored in a database. Surprisingly, the Applicants have found that a neural network classifier was able to work significantly better than traditional approaches, e.g., keyword searches, for finding problem kernels by better dealing with the variety of ways unmet technical needs or requirements are expressed. In some exemplary embodiments, documents are analyzed using a sentiment analyzer to identify sections (e.g., words, word n-grams, clauses, phrases, sentences, groups of sentences, paragraphs, groups of paragraphs, etc.) of the document having negative tone or positive tone. The term "positive tone" refers herein to a score from a sentiment analyzer on a subset of a document that indicates that the subset of text refers to a solution, improvement, or positive outcome. Sentiment analysis can be performed on portions of the text using a variety of approaches including a traditional linear classifier or neural network and leveraging either keyword based searches or human annotated data as training data, similar to methods described above or averaging the score of words in a portion of the text based on a preset list of words and their scores. In exemplary embodiments, portions of the text that are scored as negative are then classified as problem kernels.

In certain exemplary embodiments, individual sentences are identified as a problem kernel, but displayed (e.g., at user interface 100) as full paragraphs (or summarized paragraphs) to the user to help provide more context about the potential problem. In exemplary embodiments, to quickly generate large scale training data across a variety of technical domains, a keyword-based search is used to automatically label sentences that contained at least one problem word from a manually generated list ("issue", "problem", "need", etc.) and one "problem strength" word from a manually generated list ("failure", "degrade", "catastrophic", etc.).

In some exemplary embodiments, a "not problem" training set is used, wherein the "not problem" training set is compiled using sentences with starting prefixes that indicated they were not a problem. For example, document titles can be used to generate a "not problem" set. In exemplary embodiments, this initial training set is then used to create an initial Deficiency Recognizer that outputs scores between 0 and 1 for whether or not a sentence is a problem (1 is definitely a problem, 0 is definitely not). A variety of tools can be used to train the Deficiency Recognizer including convolutional neural networks (using character n-grams or word n-grams to encode the input), Sentence2Vec, FastText, etc. In exemplary embodiments, a subset of sentences receiving "borderline scores" from the initial Deficiency Recognizer (e.g., scores between 0.75 and 0.9) is manually evaluated and annotated as problems or not problems. In exemplary embodiments, the additional sentences identified as problem kernels are added to the training data, and a final version of the Deficiency Recognizer is trained on the full set of problem kernel sentences. In some exemplary embodiments, all input for the Deficiency Recognizer is generated with manual (human) annotation. In some exemplary embodiments, sentences with scores 0.9 and above from the Deficiency Recognizer are labeled as problem kernels (other thresholds can be used). Results may then be compared to a test set of sentences that has been manually annotated, but not used to train the Deficiency Recognizer. In some embodiments, sentences are broken into clauses using standard natural language processing techniques to uncover the syntax of a sentence or simple rules (e.g., clause 1 contains all text before the word 'and' and clause 2 is all text after 'and'). In such exemplary embodiments, the Deficiency Recognizer is trained with training examples comprised of problem kernel clauses, rather than full problem kernel sentences.

In some exemplary embodiments, the documents and/or problem kernels can be grouped by related concepts or entities, e.g., companies or industries. Some of these related concepts are already linked to the document and commonly contained in metadata of the document. For example, in exemplary embodiments, the company, organization, or individual who authored or published a document is stored alongside the text of the document as metadata and can be used to associate a company entity with the document. The concepts or entities in the metadata can allow for further concepts to be associated with the document. For example, the geographic location of the entity can then also be associated with the document and added to the metadata. Further concepts can be associated with the document using a classifier. For example, an industry classifier can be used to associate an industry with the document. The industry classifier logic could make the determination based on a range of inputs including the text of the document, existing classifications of the document, e.g., Cooperative Patent Classification (CPC) for patents, or the industries most commonly associated with the entities who authored or published the patent. Applicants have found that the title and abstract (where an abstract is available) are generally sufficient to classify the industry of a document with about 80% accuracy. Applicants have also found that a number of documents do not have a clear industry association even when the text is manually reviewed and believe that adding additional features, e.g., CPCs or company industry information, is integral to improving the accuracy of the classifier. In some exemplary embodiments, while generating training data for the industry classifier, the Deficiency Recognizer was also trained to also classify subsets of the document into additional classes, e.g., industry-related text, at the same time we trained it to recognize problem kernels. Identifying industry-related text helped generate a large initial training set for an industry classifier, preferably with manual (human) annotation of the resulting documents, although keyword based labeling of the training set is also contemplated.

In an exemplary embodiment, the industry classifier logic assigns industry labels based on the existence or frequency of Technology Elements in a document (described below). In some exemplary embodiments, document-level classifications are added to other databases. For example, for non-patent documents, transfer learning can be used to associate CPCs with documents by training a multi-label neural network classifier (using patent documents which have known CPC labels) to accept the abstracts of documents as input and to output predicted CPC labels. A similar process can be used to associate geography with a document by using the country in which it was published or the country its authors are from. The term "geography associated with" as used herein refers to the country, region, continent, or other geographical grouping that best describes where the document was original published and/or authored.

In exemplary embodiments, the predictive models are document type specific, i.e., they take into account specific language expected to be found in that type of document. For example, US patents often include language such as "object of the present invention is to provide an improved" or simply "object of the present invention" or "object of the present application" which may signal the presence of Technology Elements, e.g., products, materials, or of related concepts, e.g., industry. Similarly, patents, patent applications, journal articles, or other technical documents sometimes include headings such as "problem to be solved" that signify that a portion of text is a problem kernel. In exemplary embodiments, these "signifiers" are used to quickly create the initial training set for that document type. In exemplary embodiments, a document specific prediction model is created for different document types to improve the accuracy on that type of document. In other embodiments, a universal model, e.g., Deficiency Recognizer, is trained with input from multiple different types of documents and is used to recognize problem kernels across all documents. It is believed that ideally, at least a few thousand documents from each type of document that will analyzed are used to train such a universal Deficiency Recognizer for that type of document. In further exemplary embodiments, the problem kernels recognized by the Deficiency Recognizer can be further scored using a variety of metrics or analyses. For example, a sentiment analyzer can be used to score the "magnitude" of each problem kernel. Surprisingly, in an exemplary embodiment with a relatively modest set of labeled training data (tens of thousands of examples) a simple neural network was trained to accurately score the magnitude of problems from 0 to 4 with 4 being the most serious problems and 0 being the most minor problems (where human annotation was used to create the training and evaluation sets). In another exemplary embodiment directed toward simple technical documents, results from a sentiment analyzer that uses a simple word-score list and sums the individual word scores into a sentence score were also adequate, likely due to the straightforward, descriptive nature of technical documents text.

In exemplary embodiments, search logic 24 accepts user input in the form of query search terms (e.g., via user interface 100) and uses at least those query search terms and output from textual classifier logic, e.g., deficiency recognizer logic, to score each document/subset as a candidate for identifying unmet technical needs and/or technical problems (i.e., scoring to indicate the presence of a problem kernel in that document/subset). In certain embodiments user input may be automatically associated with a technological field. The possible technological fields may be associated with suggested terms that can be presented to a user (e.g., at user interface 100) during a query to further enhance the possible search input by the user. In some embodiments, search terms may be combined with an associated technological field and/or one or more suggested terms and/or concepts to enhance a query.

In exemplary embodiments, search logic 24 performs a textual analysis of documents to score documents, or subsets of documents as part of scoring each document, as candidates for identifying unmet technical needs, technical requirements, and/or technical problems relevant to the query search terms. In some exemplary embodiments, search logic 24 includes (a) automatically identifying at least one subset of each document (called a "problem kernel" herein) that expresses a technical problem or an unmet technical need and (b) scoring each problem kernel based on at least relevance to user-entered query search terms. In some exemplary embodiments, a score associated with the negative tone in that problem kernel (obtained with a sentiment analyzer as described above) and/or in other parts of the document (and/or based on data external to the document) can be combined with the relevance score to create a final score for the document that ranks documents describing very negative problems more highly than documents describing minor problems. The term "negative tone" refers herein to a score from a sentiment analyzer on a subset of a document that indicates that the subset refers to a problem, deficiency, or negative outcome. Based on the score, negative tone can be further grouped into categories, e.g., minor problem, substantial problem, catastrophic problem. For example, the terms "catastrophic failure" and "substantial morbidity and mortality" both have a negative tone and would be classified as catastrophic problems while "relatively bulky" and "is uncomfortable" both have a negative tone and would be classified as a minor problem. It is appreciated that after scoring, results showing the highest scoring documents and/or problem kernels may be displayed at user interface 100.

In some exemplary embodiments, the magnitude of consequences and and/or magnitude of the deficiency are scored. A variety of techniques can be used for this including using manually scoring keywords and summing the results or having humans annotate examples of minor and major deficiencies, as discussed above. In some exemplary embodiments, problems are classified into different types, e.g., cost, manufacturing yield, safety, comfort, each of which have a specified severity score. Each problem kernel can contain one or more problem types. For kernels that contain more than one problem type, the scores for each individual problem type are averaged, the maximum problem type score within the problem kernel can be used as the score for the problem kernel, or certain problem combinations may have a specified score that can be used. The problem type classifier can be trained using a multi-label classifier, e.g., ensemble convolutional neural network, trained on positive and negative examples for each problem type from problem kernels. In some exemplary embodiments, the training data is created by performing a keyword search for each type of problem within a database of stored problem kernels as well as a keyword search for problems within the database of stored problem words that do not contain any of the keyword search string for the problem type. In other exemplary embodiments, human annotators manually review the problem kernels in the database that do not match the keyword searches for any of the problem types to both provide additional training data and determine if any additional problem types should be added to the problem type classifier. In some exemplary embodiments, one or two or more of the sentiment analysis score, magnitude of the consequence score, and problem type score are combined into a final score by methods including or not limited to: summing the scores, averaging the scores, weighting each score before summing, or weighting each score before averaging.

Tagging Problem Kernels

In some exemplary embodiments, problem kernels are analyzed with Technology Element Recognizers to identify Technology Elements. Such technology elements can be expressed as a sequence of one or more characters or one or more words. The term "Technology Element Recognizers" refers herein to a named entity recognizer that can recognize segments of the text that refer to technology elements and a classifier or multiple classifiers that can classify those segments of text into different types of technology elements. The term "Technology Elements" refers to subsets of text in a document or problem kernel (most commonly a set of characters, word, set of words, clause, or individual sentence) that names and/or describes the products, components, systems, materials, functions, processes, associated characteristics or attributes, markets or industries, companies, trends, and scalars associated with a given excerpt of text. In some embodiments, identification of Technology Elements can utilize an ontology of concepts and/or knowledge graph to associate various similar or related subsets of text with the same Technology Element, e.g., synonyms or alternative ways of expressing a given concept. In some embodiments, problem kernels are tagged with the Technology Elements that are only directly contained in the problem kernel text.

In exemplary embodiments, the tags associated with a problem kernel can also include additional Technology Elements that are linked to those contained in the text via an ontology, for example but not limited to "parent" classes of the Technology Element for a more generalized concept. As an example, a problem kernel that mentions a form of the Technology Element "Dipole Antenna" could also be tagged in this manner with the more general "parent" concept of "Antenna", or even with the more general "Wireless Communication System", etc. As another example, "Signal Loss" could be represented more generally as a type of "Signal Performance". In some embodiments, the tags associated with a problem kernel can also include Technology Elements from other supporting text in the document, such as text being referenced by the problem kernel, or text providing additional context on the problem kernel or the subject of the problem kernel.

In some embodiments, additional logic may be used to determine which of the Technology Elements tagged on the problem kernel best characterize the nature of the problem kernel and classify them as such. For example, it is possible to leverage an ontology and its various classifications, sentence grammar, dependency structures, part-of-speech tagging, and/or semantic parsing to identify the meaning associated with the various Technology Elements tagged on the problem kernel. Take, for example, the following problem kernel:

"In 5G communication systems, the frequencies used are high-frequency and ultra-high-frequency, and because 5G communication has high bandwidth, the diffraction rate is significantly lower than that of other technologies, resulting in problems with path loss and shadow areas due to obstacles in the middle of the transmitter and receiver."

In this instance many Technology Elements are mentioned or implied, such as "5G communication systems", "diffraction rate", "bandwidth", "path loss", "shadow areas", "obstacles", "transmitter", "receiver", etc. However, only some of those Technology Elements truly represent the core concepts of the problem, and others merely provide additional context. In another potential embodiment, logic combining machine learning models, structured ontologies, and/or heuristic functions could be used to emphasize that 1) "5G communication systems" is what we would consider the subject or technology of focus of this problem and should be considered a "core concept", and 2) that "path loss" and "shadow areas" should be considered the problematic features or attributes and thus also "core concepts". Additionally, in some embodiments, "obstacles", "high bandwidth", "diffraction rate", and "frequency" could be classified as underlying contributing factors to the core problem and considered as "secondary concepts."

The term "ontology" as used herein refers to a complex arrangement of linked elements (for example, in a hierarchical format) where sets of items that are described by another term are arranged into a subset of that term. It is appreciated that the ontology described herein may be embodied in one or more ontology databases (e.g., one of databases 22). For example, in an exemplary ontology, glass may have a subset that contains soda lime glass and borosilicate glass. Borosilicate glass may have additional subsets, one of which contains types of borosilicate glass, e.g., non-alkaline-earth borosilicate glass, alkaline-earth containing borosilicate glass, and high-borate borosilicate glass, and another subset containing borosilicate glass product names, e.g., BOROFLOAT, DURAN. In exemplary embodiments, these borosilicate glass product names are further linked to the type of borosilicate glass they contain. Simple ontologies, e.g., Linnaean taxonomy, can be imagined or visualized (e.g., at user interface 100) as a traditional taxonomy tree that shows their hierarchical nature, but more complex ontologies can contain multiple kinds of links between elements and may need to be imagined or visualized as a series of linked trees or a network diagram. The initial ontology contains the Technology Element name as well as alternative names or ways to refer to the Technology Element. The names and terms can be an individual word or group of words (n-gram). For example, television, TV, and TV set can all be grouped together to refer to the Application "Display: Television". The terms "associating . . . to create an ontology" herein refer to the process of creating an ontology of concepts based on their known relationships from external sources or their co-occurrence or similar usage within and across documents. Thus, the terms "associating" used in "associating Technology Elements to create an ontology" refer to herein to the process of creating an ontology of Technology Elements based on their known relationships from external sources or their co-occurrence or similar usage within and across documents. In some exemplary embodiments, where a sufficient number of documents exist, a simple list of linking words or phrases is created and the initial ontology is built of Technology Elements that are proximate to each other and have a linking word or phrase between them. These linking words or phrases signal a particular type of relationship between two or more Technology Elements. For example, for Application Technology Elements, relationships and linking words include: identical ("synonymous") or similarly grouped Technology Elements ("i.e.", "or other", "and other"), components of a product ("consisting of", "embedded in"), or Application Technology Elements that are a subset of another Application Technology Element ("more specifically", "such as", "that includes"). In some exemplary embodiments, the following are performed: associating a plurality of the identified Technology Elements to create an ontology of identified Technology Elements; and displaying the ontology of identified Technology Elements on at least one computer display. In some exemplary embodiments, when user search input includes at least one Technology Element, the Technology Element ontology is used to identify all Technology Elements that are subsets of the Technology Elements in the user search input and documents relevant to these subset Technology Elements are returned in addition to any documents relevant to the user search input. In some exemplary embodiments, users can choose whether to include subset Technology Elements in their search results.

Creating Structured Representations of Problem Kernels

In some additional embodiments, logic can be used to automatically construct a title, headline, or structured label of the core aspects of the problem kernel. For instance, in some embodiments, various automated methods including machine learning models, heuristics, "human-in-the-loop" review, etc. can be employed to automatically characterize the aforementioned problem kernel in various ways, such as "Subject: 5G Communication Systems, Problems: Path Loss, Shadow Areas", or "Path Loss Issues in 5G Communication Systems", or "Path Loss in 5G Communication Systems due to Obstacles, High Bandwidth, and Low Diffraction Rate."

In some additional embodiments, a single problem kernel can be characterized by multiple combinations of Technology Element tags, creating a wide variety of potential tag-based representations of that problem kernel. For instance, the aforementioned problem kernel could be represented as both "Path Loss in 5G Communication Systems", "Shadow Areas in 5G Communication Systems", or even more generally as "Signal Performance in Wireless Communication Systems."

Aggregating Similar Problem Kernels into Problem Groups

In some additional embodiments, problem kernels can be grouped together based on their possessing identical or similar tags, whether "core concepts" or "secondary concepts," or based on possessing identical or similar tag-based representations. Such aggregations shall herein be referred to as "Problem Groups." In some embodiments, this is done by automatically counting the number of problem kernels with the same exact representations and creating a Problem Group database with details on each Problem Group, including their automatically-generated tag-based representation and connected to the individual problem kernels and their associated documents and metadata. In other embodiments, this is done by aggregating similar problem kernels with nearly the same tags/tag representations to create approximate matches. In some additional embodiments, such closely but not exactly related Problem Groups are not aggregated together, but rather associated with a given Problem Group in the Problem Group database (e.g., one of database(s) 22) as "related problems."

In some additional embodiments, additional logic can be used to associate various Technical Solutions with each Problem Group. In some embodiments, this can be done based on using an ontology and/or named-entity recognition approach to identify Technology Elements, such as products, components, materials, technologies, etc. mentioned elsewhere in innovation-related publications (e.g., patent documents, scientific journals, product introduction press releases) that also contain problem kernels associated with the Problem Group. In some embodiments, this can be done by isolating likely "Technical Solution Passages" in different publication types, such as the Abstract or Patent Claims. In other embodiments, this can be done by using a "Technical Solution Recognizer" to identify sections (e.g., clauses, phrases, sentences, groups of sentences, paragraphs, groups of paragraphs, etc.) of the publication that include words that might indicate a technical solution is being proposed in similar fashion to the aforementioned technical solution recognizer. In some further embodiments, Technical Solutions can be identified and/or analyzed via a complementary system (e.g., Goldfire, PatSnap, etc.).

In some additional embodiments, additional qualitative information associated with the Problem Group can also be aggregated, such as the specific organizations mentioning the problem, the organizations proposing solutions to the problem, the individual people actively mentioning or working on the problem, the countries or regions of origin of the problem, the publications and data sources associated with each Problem Group, etc.

Measuring Statistics Associated with Problem Groups

In some embodiments, additional logic can measure various statistics about each Problem Group, including but not limited to its total number of unique mentions in publications (e.g., prevalence of one or more problem kernels), the timing of such mentions including the age (i.e., the time since its first mention) and recency (i.e., the time since its last mention), the trend (e.g., growth and/or acceleration) of such mentions, the number of unique companies or organizations mentioning the Problem Group, the number of various types of publications, the number of unique "Technical Solutions" being proposed as solutions to the problem and their timing and mentions, etc.

In some embodiments, such statistics can be utilized to create custom metrics, such as but not limited to 1) "Innovation Activity", 2) "Problem Intensity," 3) "Value Creation Potential," and 4) "Opportunity"

In certain embodiments, an Innovation Activity value can be constructed by taking a combination of components such as, but not limited to, any two, three or more of (or all of) the following variables:

P=total number of innovation-related publications that either have problem kernels related to the Problem Group or mentions of Technical Solutions associated with the Problem Group, calculated per year (e.g., from Patent Documents, Scientific Journals, Technology Spec Sheets and Overviews, Press Releases of New Product Introductions, etc.), in some cases transformed or normalized via methods such as but not limited to Linear, Logarithmic, or Exponential weighting, Linear Normalization, etc.

C=total number of unique companies or organizations publishing related problem kernels, or Technical Solutions related to such problem kernels, in innovation-related publications, in some cases transformed and/or normalized.

S=total number of unique Solutions being proposed in innovation-related publications to address the Problems mentioned in their respective problem kernels, in some cases transformed and/or normalized.

I=total venture or R&D investment over time in the Technical Solutions associated with the Problem Group, potentially transformed and/or normalized similar to others.

$\Delta_p$=trend of innovation-related publication activity over the time frame featuring associated problem kernels or Technology Solutions, in some cases calculated based on a combination of overall growth rate and marginal acceleration, in other cases calculated based a calculation of the average monthly growth rate over the time period with potential transformations to weight the most recent growth rates more heavily. In some embodiments, this can be normalized based on the overall trend in publication activity in the entire innovation-related publication corpus to account for overall growth.

$\Delta_c$=trend of number of unique companies publishing with related problem kernels or Technical Solutions over the time frame, potentially calculated or transformed similarly to $T_p$.

$\Delta_s$=trend of number of unique Technical Solutions proposed in publications with related problem kernels over the time frame, potentially calculated or transformed similarly to $T_p$ and $\Delta_c$.

In some embodiments, any two, three or more of (or all of) the above components can be algorithmically combined (e.g., added and/or multiplied together) (perhaps with other components) to form an aggregate "Innovation Activity" Score, which can be further transformed and/or normalized.

In some additional embodiments, many potential measures of "Technology Maturity" or "Technology Readiness" can also be included in or substituted for "Innovation Activity" via complementary systems (e.g., Goldfire, PatSnap, etc.) and/or methods to understand not just the amount of innovation associated with a new technology, but also its level of maturity or commercial readiness. One such method can be found in "Technological Improvement Rate Predictions for All Technologies: Use of Patent Data and an Extended Domain Description" by Singh et al., Research Policy, Volume 50, Issue 9, 2021, 104294, ISSN 0048-7333, (https://www.sciencedirect.com/science/article/pii/S0048733321000950).

In some embodiments, a "Problem Intensity" value can be calculated by taking a combination of components such as, but not limited to, any two, three or more of (or all of) the following:

P=total number of publications that have problem kernels related to the Problem Group per year (e.g., including innovation-specific sources as well as others, such as but not limited to online articles, social media sites, blogs/forums, customer/product reviews, news, etc.), in some cases transformed or normalized via methods such as but not limited to Linear, Logarithmic, or Exponential weighting, Linear Normalization, etc.

I=a measure of the "impact" of the problem. In some embodiments, this can be measured for example, via a version of "centrality" (e.g., but not limited to eigenvector centrality, betweenness centrality, degree centrality, etc.) in the overall problem corpus, as measured via a network analysis where nodes represent Problem Groups and edges represent each Problem Group being referenced in a common document/publication. Higher measures of centrality could be interpreted to indicate a higher "influence" on the market. In some embodiments, "influence" can be simply a measure of the "impact factor" of the publication as measured by journal citations and/or various ranking factors used by publishers, in the case that it exists. In some additional embodiments, the "supply chain position" can be assessed to augment this impact factor. For example, if the Problem Group is primarily about a fundamental technology, such as a "material" or "technology" or "manufacturing process" (as classified in an ontology), and it was highly central in the corpus, and related to many downstream technologies, such as a "component" or "product" it could be considered to be a "bottleneck" Problem and thus have a high "impact" score. In some additional embodiments, if the downstream component or product has a high level of Innovation Activity, this "impact" score could be weighted higher accordingly. As with the other variables, "impact", once calculated, can be transformed and/or normalized via methods such as but not limited to Linear, Logarithmic, or Exponential weighting, Linear Normalization, etc.

O=total number of unique organizations publishing related problem kernels in publications, in some cases transformed and/or normalized.

N=novelty of the overall Problem Group in all publications.

$\Delta_p$=trend of publication activity over the time frame featuring associated problem kernels, in some cases calculated based on a combination of overall growth rate and marginal acceleration, in other cases calculated based a calculation of the average monthly growth rate over the time period with potential transformations to weight the most recent growth rates more heavily. In some embodiments, this can be normalized based on the overall trend in publication activity in the entire innovation-related publication corpus to account for overall growth.

$\Delta_c$=trend of number of unique companies publishing with related problem kernels over the time frame, potentially calculated or transformed similarly to $T_p$.

M=current or recent "magnitude" of problem expressed in the language of the problem kernel, such as via sentiment analyzer or other methods, potentially transformed to weight recent activity and/or normalized.

In some embodiments, any two, three or more of (or all of) the above components can be algorithmically combined (e.g., added and/or multiplied together) (perhaps with other components) to form an aggregate "Problem Intensity" Score, which can be further transformed and/or normalized.

A "Value Creation Potential" value can be calculated for each Problem Group based on, but not limited to, any one or any two, three or more of (or all of) the following components:

M=Estimated size or scale of the market associated with products or services in each Problem Group. In some embodiments, this can be based on the approximate unit volume produced and/or sold annually for the product or service featured in the problem kernel, as aggregated from various market research databases. In some embodiments, this can be roughly estimated and/or transformed and/or normalized.

V=Estimated monetary value and/or profitability associated with the market. In some embodiments, this can be aggregated from various financial or market research databases based on the associated products or services and/or companies working on the Problem. In some embodiments, this can be estimated and/or transformed and/or normalized.

In some embodiments, any two, three or more of (or all of) the above components can be algorithmically combined (e.g., added or multiplied together) (perhaps with other components) to form an aggregate "Value Creation Potential" Score, which can be further transformed and/or normalized.

In some embodiments, an "Opportunity" value can be calculated by algorithmically combining "Problem Intensity" and/or "Innovation Activity" and/or "Value Creation Potential" (perhaps with other components), e.g., by subtracting or dividing "Problem Intensity" and "Innovation Activity" as well as adding and/or multiplying "Value Creation Potential" to form an overall measure of the potential attractiveness of the Opportunity.

In some further embodiments, "Company Opportunity" can be calculated by combining the general, non-company-specific opportunity score with Company Fit, to highlight the best opportunities that are also a good fit for an organization's technologies and capabilities.

In some embodiments, Problem Groups can be connected to their various associated topics, including the companies, markets, technologies, trends, etc. In some embodiments, each associated topic can be stored in another database or database table, potentially allowing analysis by topic. For example, one could analyze all of the Problem Groups being address by a given company, or all of the Problem Groups associated with a given market or a given product, service, or technology. It is appreciated that the Problem Groups and their associated metrics could be displayed and analyzed (e.g., via one or more visualization, filters, etc.) at user interface 100.

Analyzing Company Capabilities and Assessing Capability Fit

In some embodiments, various Technology Elements associated with companies can be analyzed and structured to represent their known technologies and technical capabilities. As an example, the corpus of documents published by a given company or organization either publicly or internally (e.g., published patent documents, journal articles, conference presentations, press releases, website documentation, product and technology spec sheets, employee trip reports, internal R&D reports and presentations, etc.) can be analyzed. In some embodiments, Technology Elements can be recognized in each document via various named entity recognition algorithms or, in other embodiments, via keyword recognition/tagging using a structured ontology, including known products, components, materials, services, processes, markets, attributes/characteristics, etc. In some embodiments, such Technology Elements can be recognized anywhere in a given document, while in other embodiments, this recognition can be isolated to specific portions of text, such as in pre-structured fields such as a document's title, abstract, claims, or tags, or via constructed fields such as "problem kernels" or "Technical Solutions."

In some embodiments, Technology Elements associated with each organization can be stored in a "Capability Database" (e.g., among database(s) 22). In some embodiments, a "Capability" is a specific product, material, or technology, e.g., "silver nanoparticles," "roofing shingles," etc. In other embodiments, such capabilities are represented as a process, function, attribute, or benefit, e.g., "high wavelength light management," "extrusion", "cell morphology", etc. In further embodiments, such capabilities could be the combination of multiple types of Technology Elements, e.g., "high-throughput polymer extrusion," "controlled nanoparticle production," etc.

In other embodiments, such Capabilities can be analyzed in aggregate to understand things like the breadth of capabilities possessed by the organization, as well as how each individual capability compares relative to one another. In some embodiments, this can be done simply by analyzing the number of mentions of various Capabilities, or the number of individual publications that mention a given Capability, the trend of such Capabilities, etc. In other embodiments, the number of mentions of a given Capability among one organization can be compared to the overall "popularity" of that Capability among all organizations, providing an indication of its potential uniqueness factor.

In other embodiments, Capabilities can be analyzed by constructing a network graph, where nodes represent each individual Capability and each edge (and potentially the weighting of each edge) in the graph represents a colocation of the two capabilities in a given document, suggesting a potential relationship. In some embodiments, this network analysis is done prior to the formation of capabilities from Technology Elements, by using community detection find related Technology Elements and assist in the process of creating Capabilities from multiple individual Technology Elements. In other embodiments, each edge can alternatively represent other relationships between Capabilities, such as "types of" relationships.

In other embodiments, such a network of Capabilities can be analyzed according to various "global" metrics, such as but not limited to its clustering coefficient, modularity, global efficiency, transitivity, etc. For instance, capability graphs with high modularity may suggest an organization possesses a number of distinct capability sets whereas those with low modularity may suggest a more universally connected set of Capabilities. In further embodiments, the network of Capabilities can be analyzed based on "nodal" metrics, such as strength, degree, centrality, etc. to understand the differences among individual Capabilities. For example, in some embodiments, a measure of strength or centrality can used to approximate how focused the organization is on that Capability (i.e., a high centrality could indicate that the Capability is highly connected to many other Capabilities and thus central to much of the organizations innovation activity, whereas a low centrality Capability could indicate that it is more isolated and separate from the rest).

In some embodiments, each Capability can be given an overall "strength" score, based on various combinations of, e.g., any two, three or more of (or all of) the aforementioned metrics. As used herein the "strength" score may also be referred to simply as a capability score. In one embodiment, an overall "strength" score is based on combining the metrics of focus (based on a combination of mentions and centrality) and the differentiation of that Capability vs. the world (and/or against a comparative grouping of similar organizations).

In further embodiments, Problem Groups and/or Technology Elements can be scored according to their "Fit" with each organization's unique Capabilities, i.e., "capability fit." For example, in some embodiments, this is done by first determining how many of an organization's Capabilities are directly mentioned in problem kernels and other text associated with a given Problem Group. In some further embodiments, this can be enhanced by determining not just how many exact Capabilities are directly mentioned, but also how many Technology Elements that are either directly associated or highly related to a given Capability, are mentioned by leveraging a knowledge graph, word vector representations, or a structure ontology. Once the number of matching Capabilities in a Problem Group is determined, one can next consider the "strength" of each matching capability and determine an overall score by adding and/or multiplying the figures together.

User Interface

Figure 3:
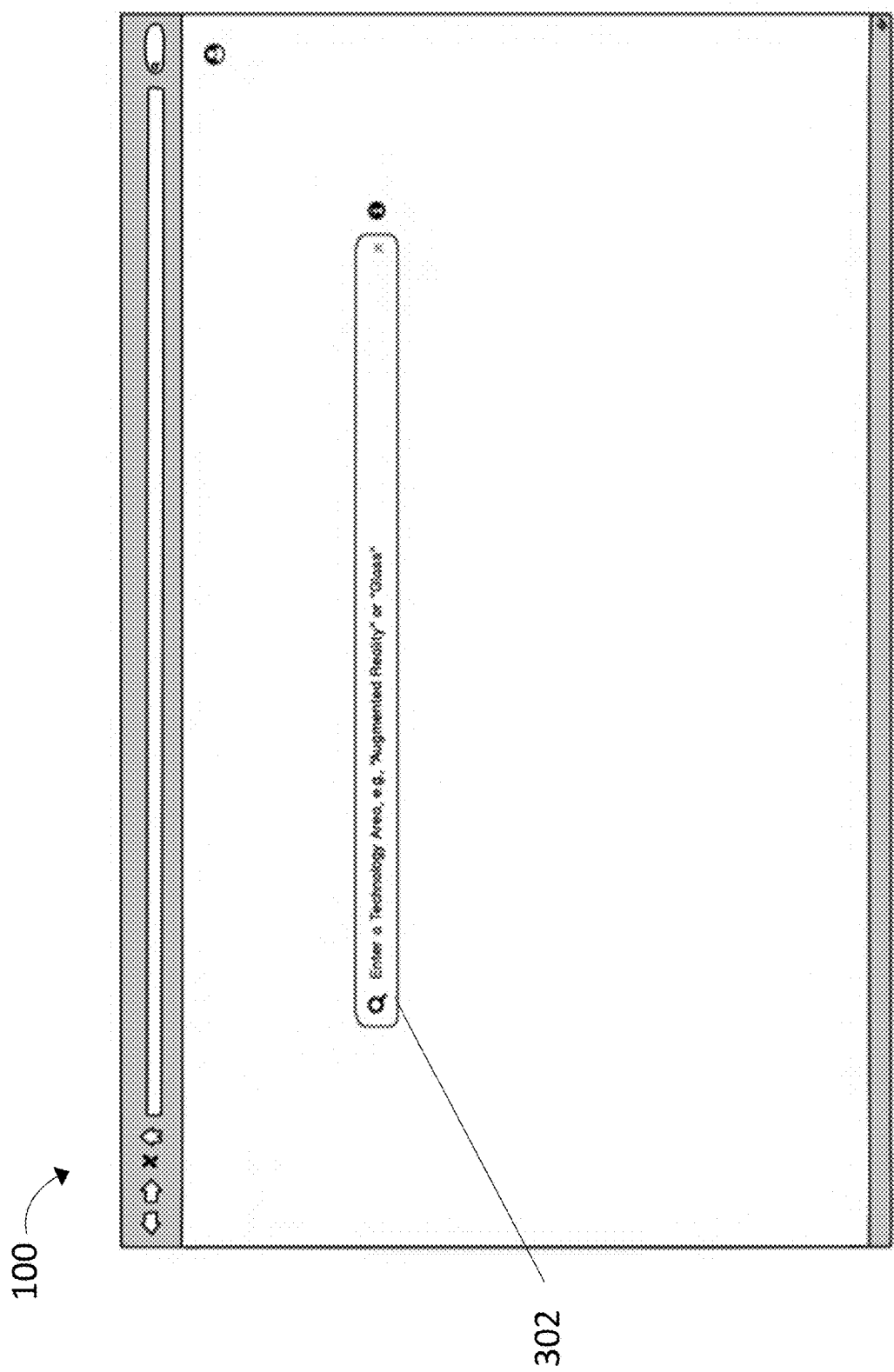
FIG. 3 illustrates an exemplary user interface with a search bar for accepting user input.

FIG. 3 illustrates an exemplary user interface 100. It is appreciated that, in certain embodiments, user interface 100 may be configured to search, display, and modify/transform results using the various data analysis tools described herein. Search bar 302 is configured to receive user input and search for technical problems or unmet needs through analysis of one or more databases as described herein (e.g., databases 22). It is appreciated that search bar 302 is further configured to search for technical problems or unmet needs based on a market or field (e.g., "optics" or "aerospace"), technology/application (e.g., "automotive batteries"), company, problem (e.g., "plastic degradation"), etc. In certain embodiments, search suggestions may be displayed in the search bar 302, for example, based on prior search history. Search suggestions may be generated by search logic 24 based on historical searches, current search session data, or all or a portion of an input search string. In some embodiments, search suggestions may be based on search popularity from other users. The search suggestions can be helpful to broaden a very specific query that may have few results. Upon entering a search input, the search bar can automatically provide suggestions matching/related terms from an ontology database and/or extracted knowledge graph to help refine the search. The ontology/knowledge graph can enhance the search by adding known synonyms, as well as all any/all things that are more specific "types of" that thing. For example, a search for "Glass", might return results for instances of "Borosilicate", their associated chemical formulas, or even potential tradenames like "Pyrex" to expand the search. Also, concepts that have multiple potential meanings, e.g., "satellite" can be refined with the ontology via suggestions like "satellite (the spacecraft system)" or "satellite (the viral agent in biology)." In some embodiments search logic 24 may automatically form associations between search terms to avoid multiple potential meanings. For example, "satellite (the spacecraft system)" may trigger search logic 24 to require mention of space or spacecraft, or removes mentions of virology based on the user's search history, user profile, etc. In certain embodiments, user interface 100 may alert a user that a search has been modified as detailed above. In some embodiments, user interface 100 may require an additional input confirming that the modified search (e.g., with certain multiple meanings omitted) is desired.

Figure 4:
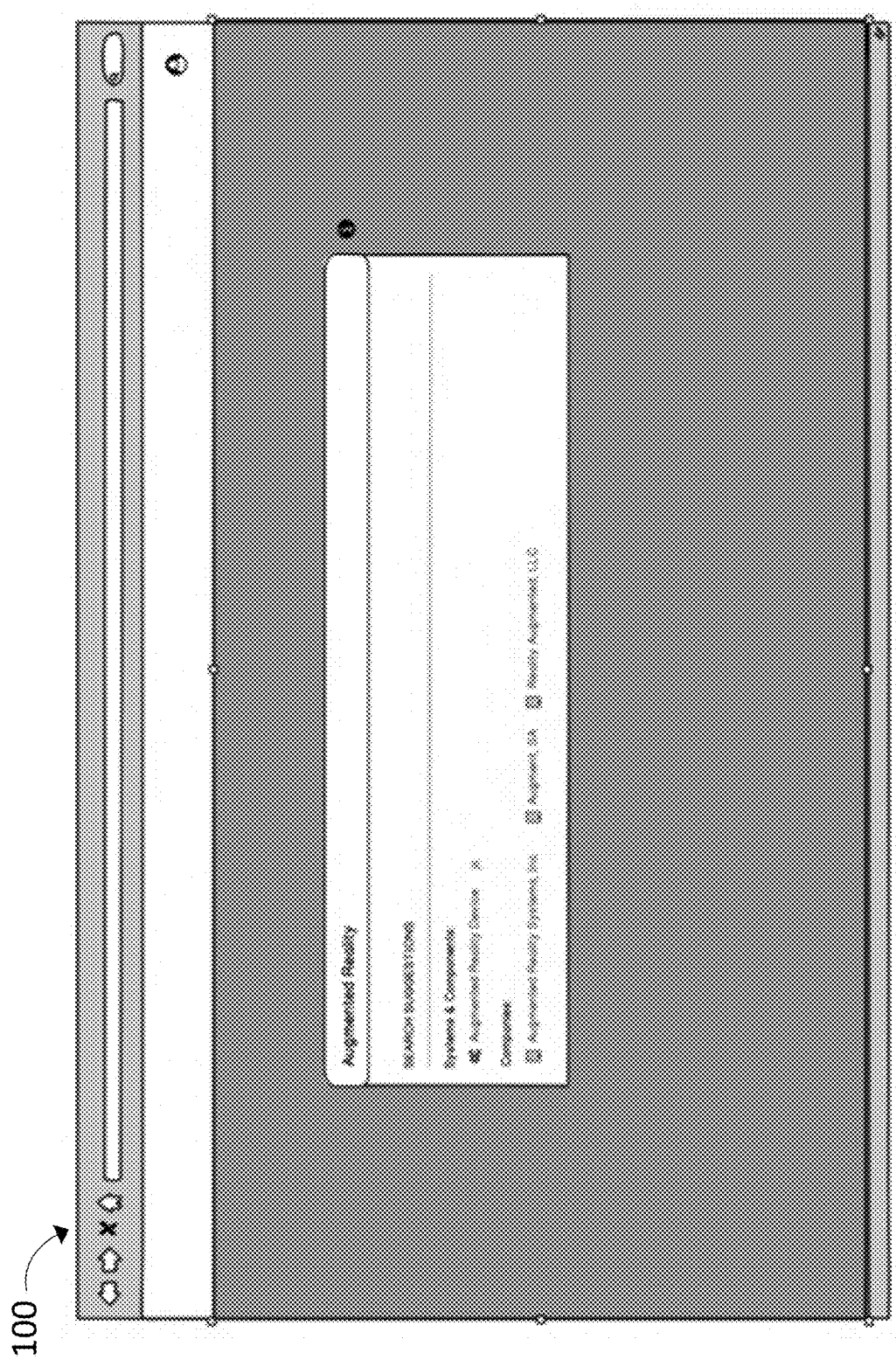
FIGS. 4-5 illustrates an exemplary user interface receiving user input.
Figure 5:
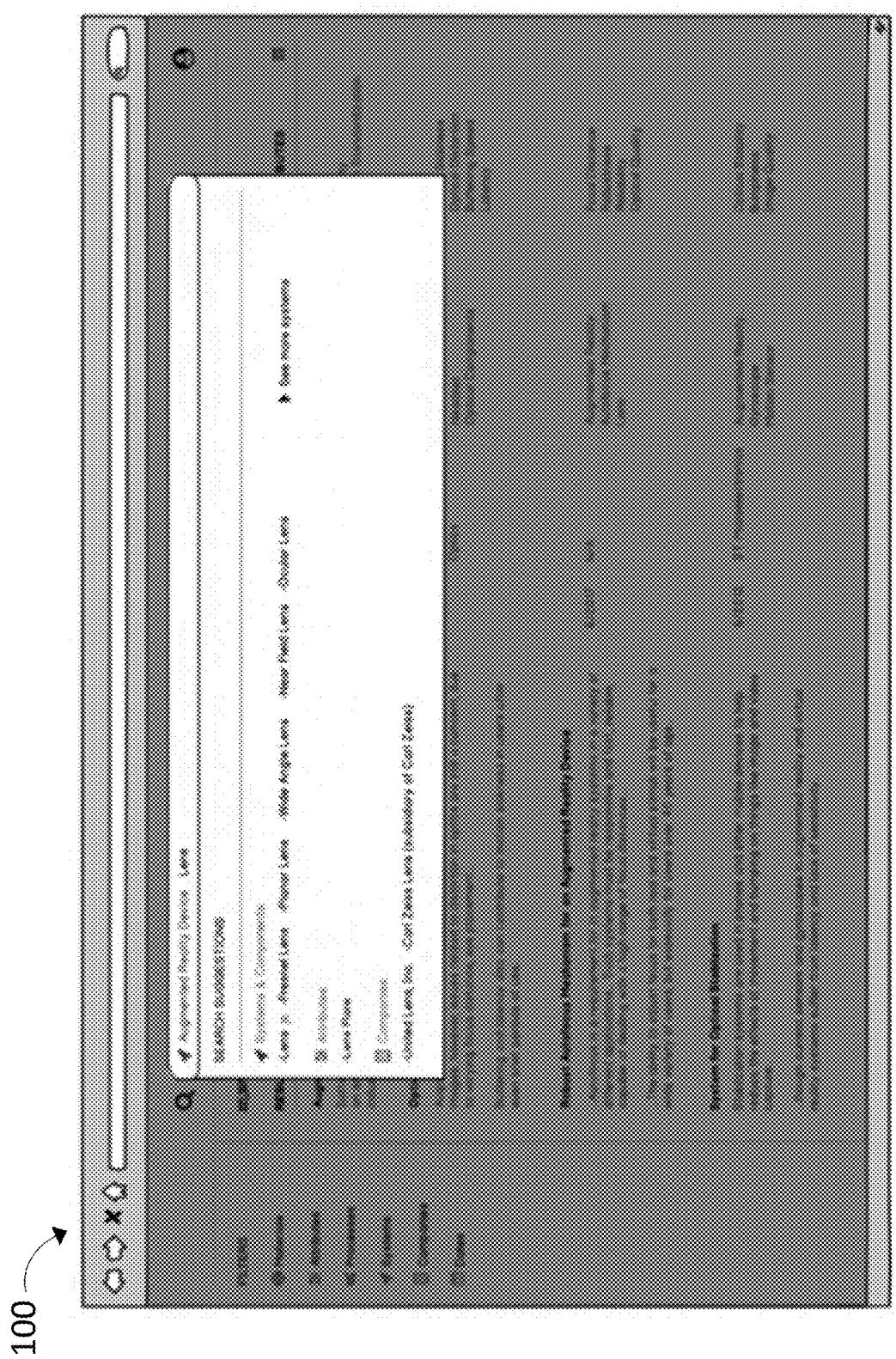

Exemplary search suggestions are illustrated in FIGS. 4-5. The suggestions can be displayed to the user at user interface 100 in a list (e.g., under search bar 302), or under various "categories", such as "companies/organizations", "products/systems", etc. In certain embodiments, search suggestions may be concept-based. Matching related terms can be done by matching on the exact name of a concept in a concept database (e.g., database(s) 22), known aliases/synonyms, and/or related concepts based on relationships between concepts that exist in the ontology database.

Each suggested concept in not merely a single "term" or "keyword", but rather it is mapped to many different ways that the particular concept could be discussed in documents and would automatically expand the search to include those things, e.g., "augmented reality" might include "augmented or virtual reality", "AR/VR", or references made in non-English languages. Concepts also can include all known "child concepts" or "types of" that concept according to the ontology, e.g., if a user searches for "augmented reality devices", the ontology database would also include references to "AR glasses" or even more specific versions like "Google Glass", which are types of augmented reality devices. In some embodiments, suggested concepts may be related to concepts already associated with a company profile and/or their identified capabilities.

The suggested concepts also specifically avoid known "false positives" based on matches with keywords that could be discussing a different topic, by either eliminating those keywords in the concept database and/or drawing on vector representations/trained machine learning models that take into account surrounding concepts and/or language patters to avoid such false positives. For instance, in the example of "augmented reality", "AR" can be a term that refers to it; however, "AR" can also refer to "antireflective" in many cases, thus the above mapping can remove such false positives.

In certain embodiments, the user can also potentially mouse-over or click on a suggested concept to understand more about what it is and what it includes, with information like a definition and/or example parent and child concepts. If a term entered does not have any exact/related concepts matching in the concept database, the user could have the option to do keyword search on that term, which would still produce results, but may not automatically refine the search beyond the exact keywords. It is appreciated that while certain exemplary embodiments may describe the user interface (e.g., user interface 100) as performing a function, an additional user computer (e.g., computers 14, 16, 20, and/or 24) may be performing the function which is then displayed at the user interface.

Figure 29:
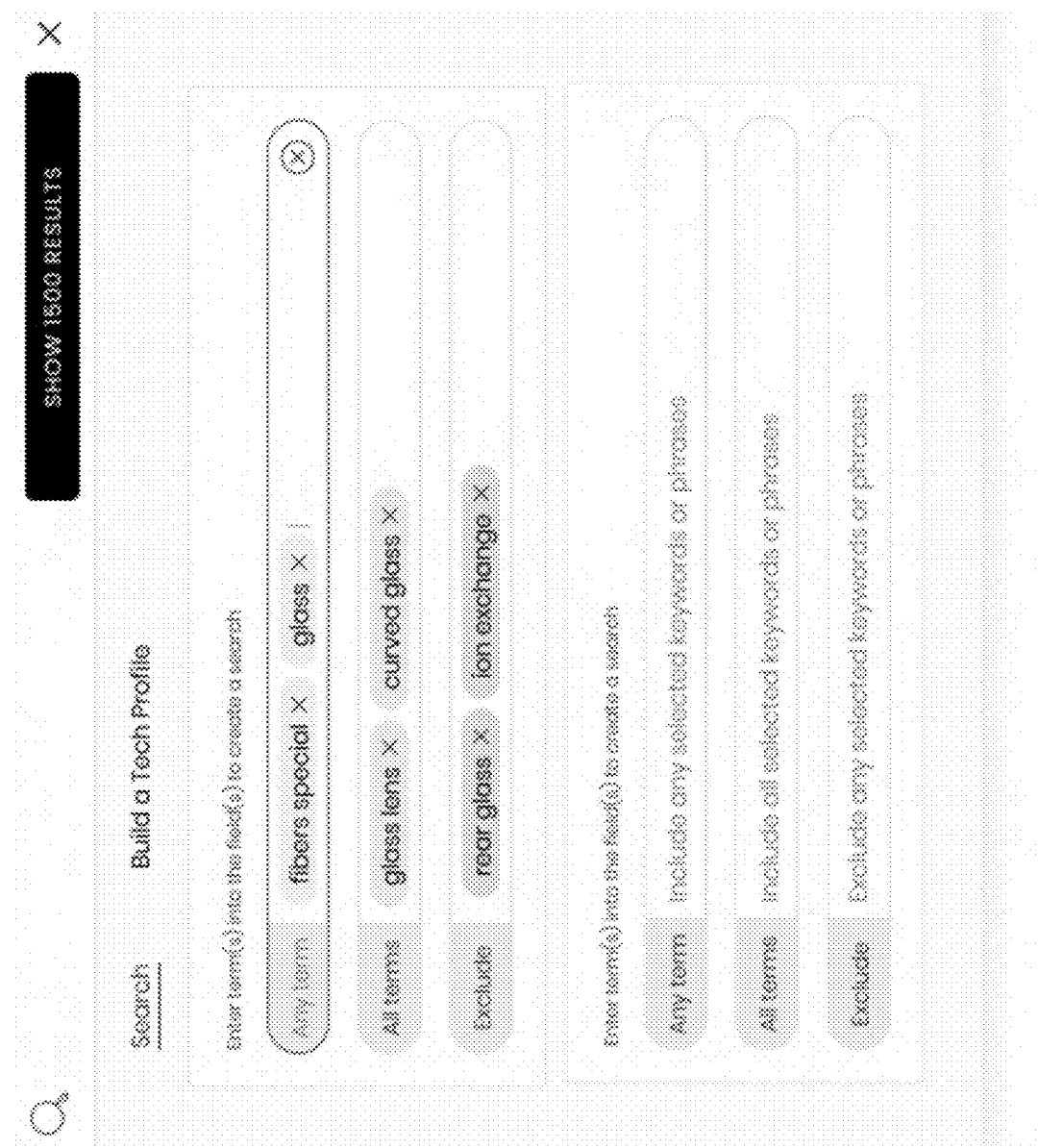
FIGS. 29-30 illustrates an advanced search in an exemplary user interface.
Figure 30:
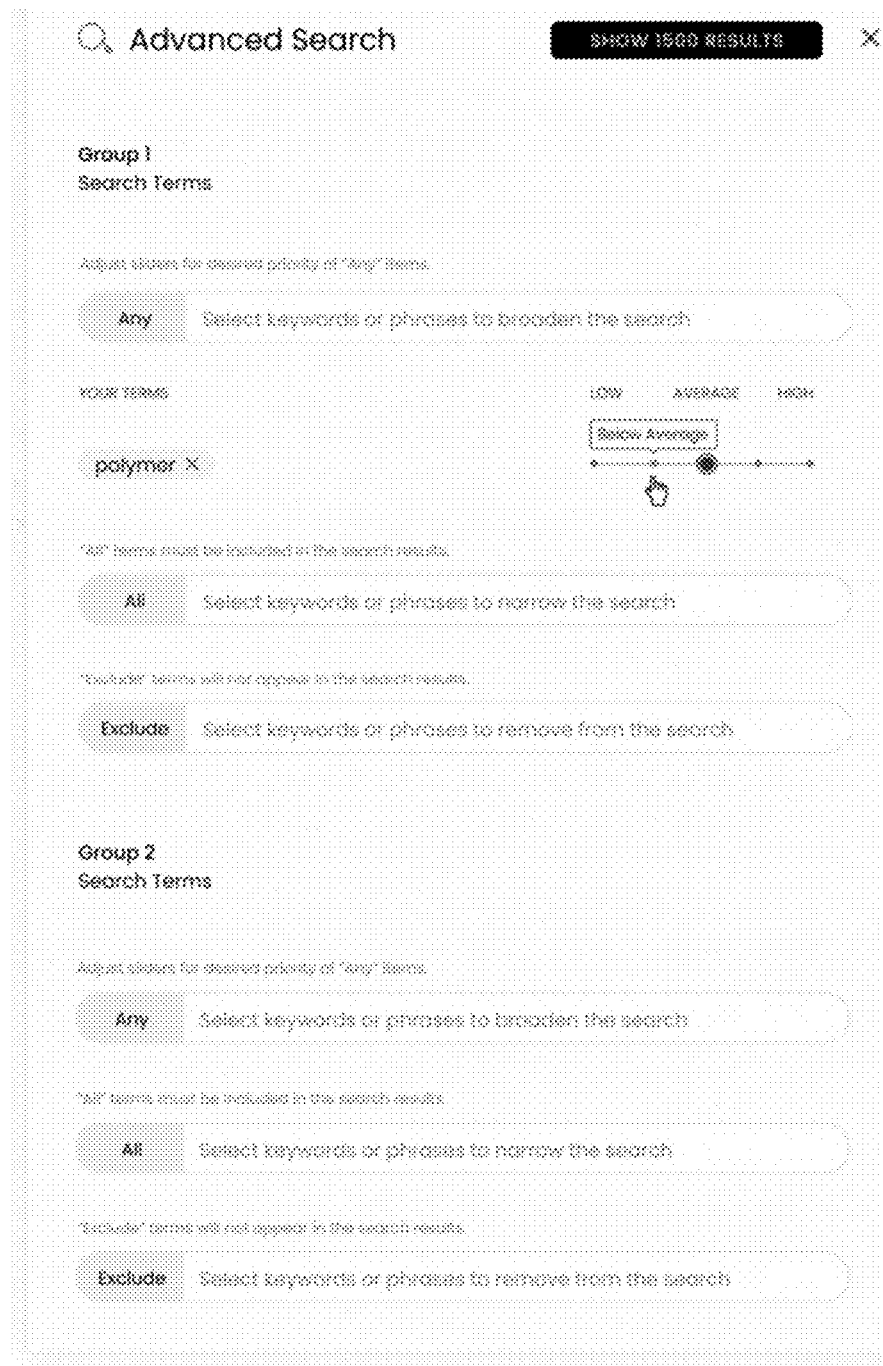
Figure 31:
FIG. 31 illustrates an exemplary technology search in an exemplary user interface.

In some additional embodiments, a user can access an "advanced search" menu, which allows for additional control of search logic, including but not limited to "ANY", "ALL", "NOT", as well as "AND", "OR", etc. One illustration of this embodiment can be found in FIG. 29. In some additional embodiments, a user can apply a weighting to each search concept, as illustrated in FIG. 30. In some additional embodiments, a user can build out a "technology search", where the user interface requires a structured representation of a given technology or family of technologies. FIG. 31 illustrates one embodiment, where a user can name the technology, describe its differentiated attributes/characteristics and/or benefits, potentially weighting them related to each other, and add additional inputs, for instance, on competitive and/or related technologies to the one in question. In this or similar embodiments, search logic can be used to identify the most relevant results (including problem kernels) to that technology, for instance, by looking for problems that reference any or all of the attributes and/or related technologies.

In some additional embodiments, the "advanced search" menu can pose a series of questions and provide the use the ability to respond via unstructured, open-ended textual responses. Such questions could include "what is the name of your technology?", "what type of technology is it?, "what makes your technology unique and valuable?", "what are competitors or alternatives to this technology", etc. In some other embodiments, a user can upload a publication or series of publications (or more broadly, textual files such as in PDF, PowerPoint, Word, Excel, or other format) via the advanced search menu. Such publications could include technical spec sheets, marketing brochures, internal presentations, research reports, emails, etc. In any such embodiments, similar to the Company Capabilities Analysis described above, the system can recognize and analyze the Technology Elements and/or Capabilities represented in either the open-ended textual responses or the uploaded publications and derive a structured output conducive to querying the database and also displaying to the user in a structured way, for instance in the form of, for example but not limited to, a list of capabilities with scores and/or weights, a network graph of capabilities, a bar, scatter or bubble chart, etc. In some additional embodiments, the system can allow the user to adjust and refine such output. Similar to above, in these or similar embodiments, search logic can be used to identify the most relevant results (including Problems) to that structured representation of a technology or set of technologies, for instance, by looking for problems that reference any or all of the attributes and/or related technologies.

Figure 6:
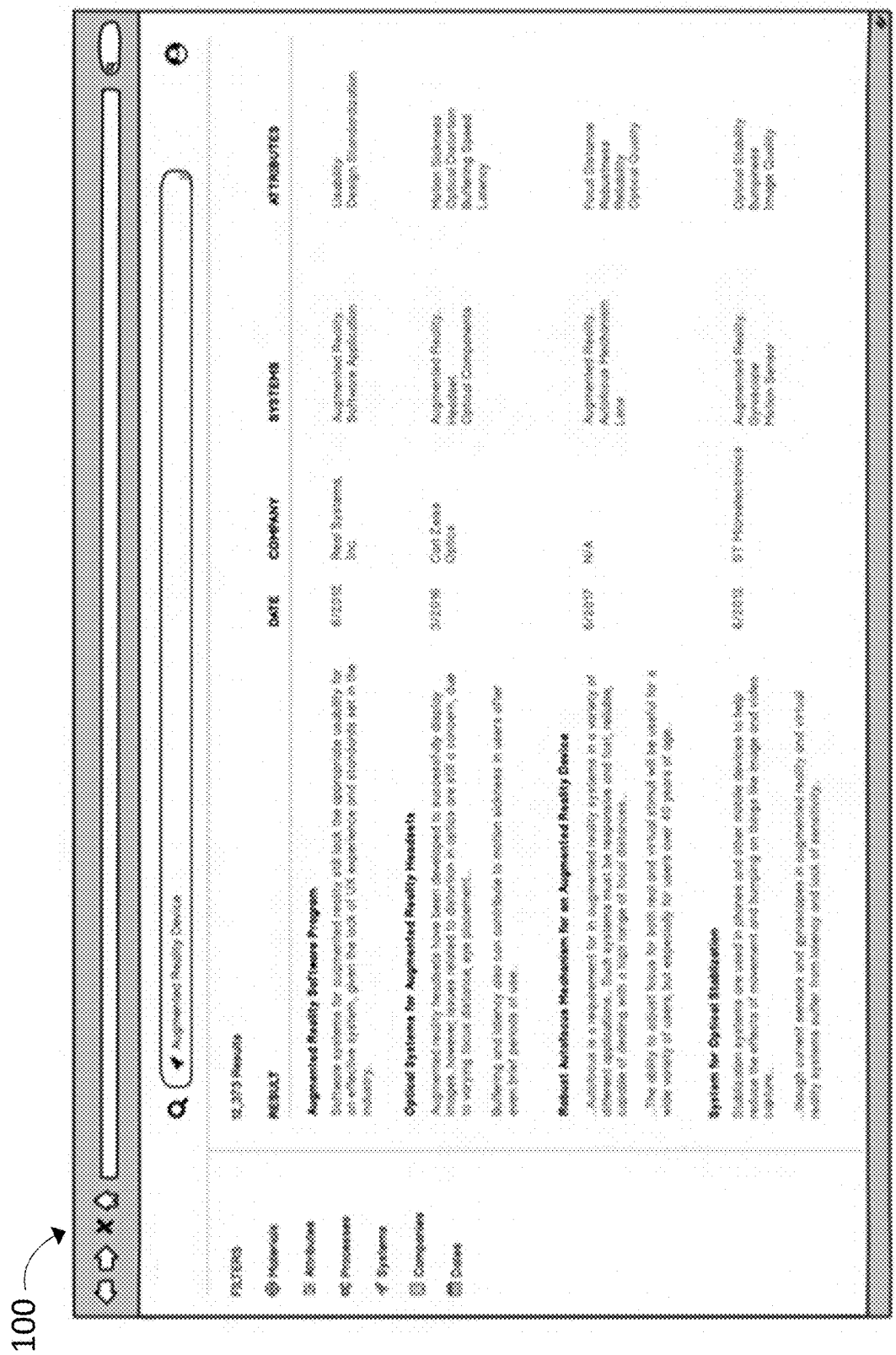
FIG. 6 illustrates an exemplary results screen displayed after user input.
Figure 26:
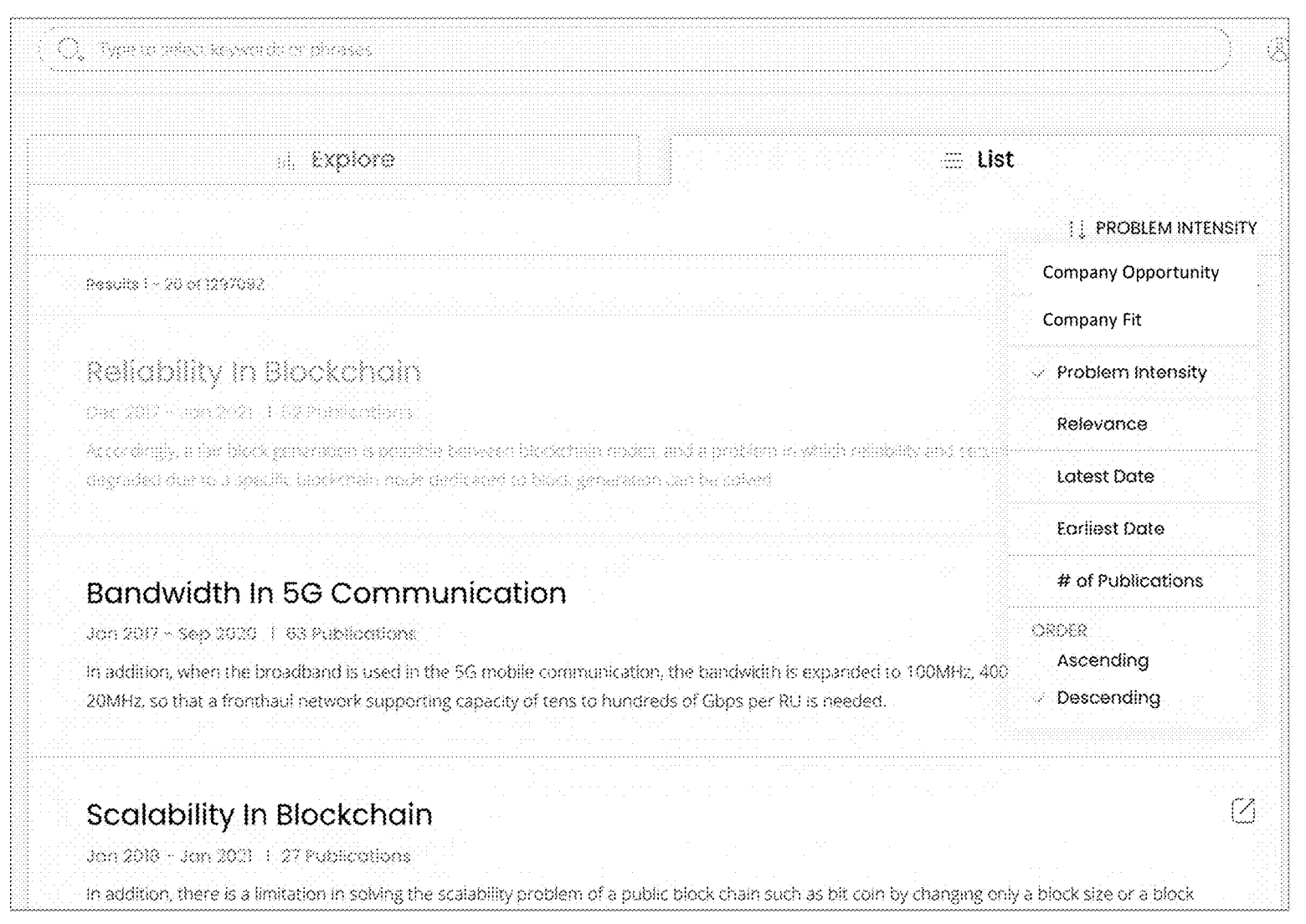

After entering a search string, the search is performed and the user interface 100 displays the results of the search. In some embodiments, the search is performed using a combination of user input, the suggested concepts and/or terms, and technological field associated with the user input. FIG. 6 illustrates an exemplary search results screen of user interface 100. After entering a search, the user can be taken to a list view of results, which could be, for example, lists of individual publications with highlighted excerpts of text from problems in that publication that discuss the search concepts, or lists of problems, topics (e.g., technologies, applications, markets, trends, etc.), or organizations which have been clustered/aggregated across various publications discussing them, with either some similar highlighted excerpts from the raw materials, or some summary description of the problem. In some embodiments, the listed results can also be sorted by metrics (e.g., problem intensity), as well as relevance, earliest date, latest date, etc. An exemplary view of sorted results is shown in FIG. 26.

The list can also show some additional metadata about each publication or problem, such as the company/organization discussing it, and any relevant concepts found in the text, such as the products/technologies, attributes, etc., it mentions.

Figure 7:
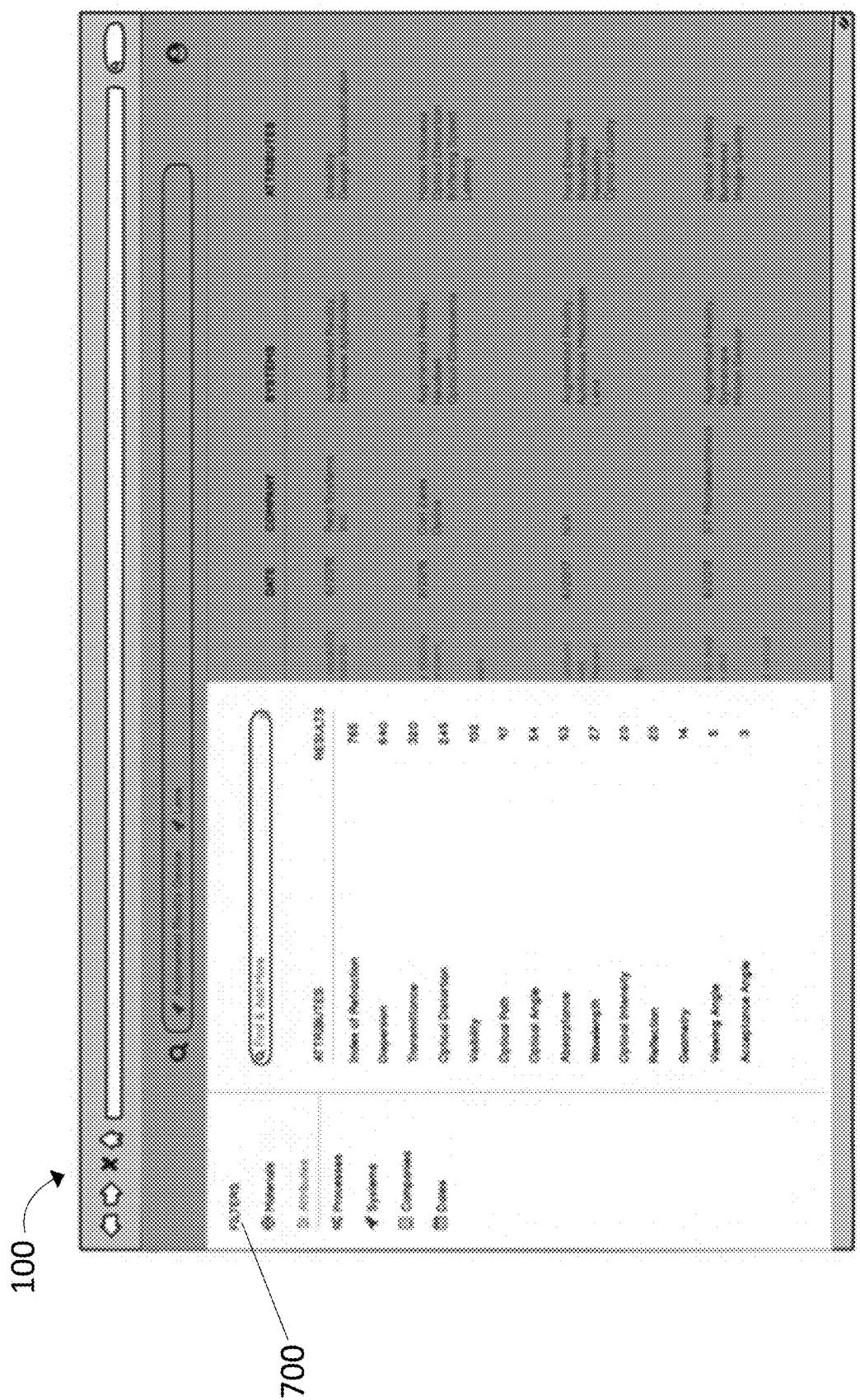
FIGS. 7-8 illustrate an exemplary user interface filtering results using a problem element filter.

If additional refinement to the search is desired, user interface 100 is configured to utilize various filters to further modify and refine search results. In FIG. 7, an exemplary problem elements filter is illustrated. In certain embodiments, user interface 100 has a filter pane 700 which lists the available filters available to refine the search results. It is appreciated that in certain embodiments, the listed available filters may change depending on the type of documents returned in the search results. The problem elements filter can further refine search results based on one or more technical concepts associated with the results such as, for example, the "materials", "systems", "processes", and "attributes" that constitute the problem. In certain embodiments, user interface 100 displays the filters that are contained in the result set, ordered by the number of results associated with each concept and further can search for a specific concept in the list of filters.

In certain embodiments, user interface 100 allows a user to view available filters in a hierarchy, rather than a "flat list", to have a better organized view of the concepts included in the results, e.g., under "attributes", a concept like "optical angle", when expanded, might show a number of child concepts, including "acceptance angle", "angle of diffraction", "angle of refraction", etc.

Figure 8:
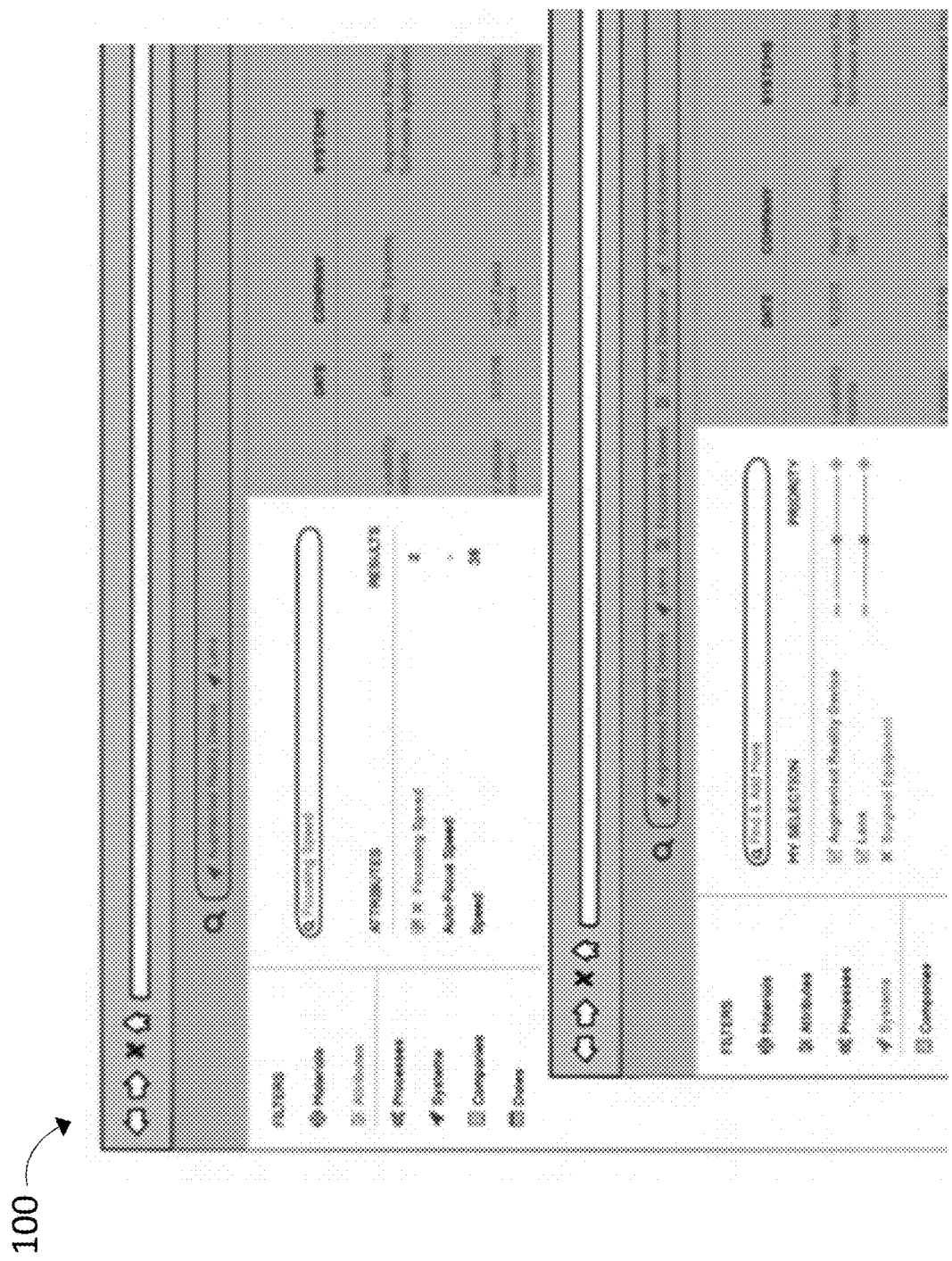

Filters may be applied or unapplied to allow greater control of the refinement of the search. For example, FIG. 8 illustrates the ability to "check" a concept which would reduce the results to only include those that relate to that concept or "x" the concept which would reduce the results in a Boolean fashion to display only those results that do not relate to that concept. After selecting a concept (i.e. a "check" or "x") the user has the ability to see which filters have been applied and add or remove additional filters to adjust the refined search results as necessary.

Figure 9:
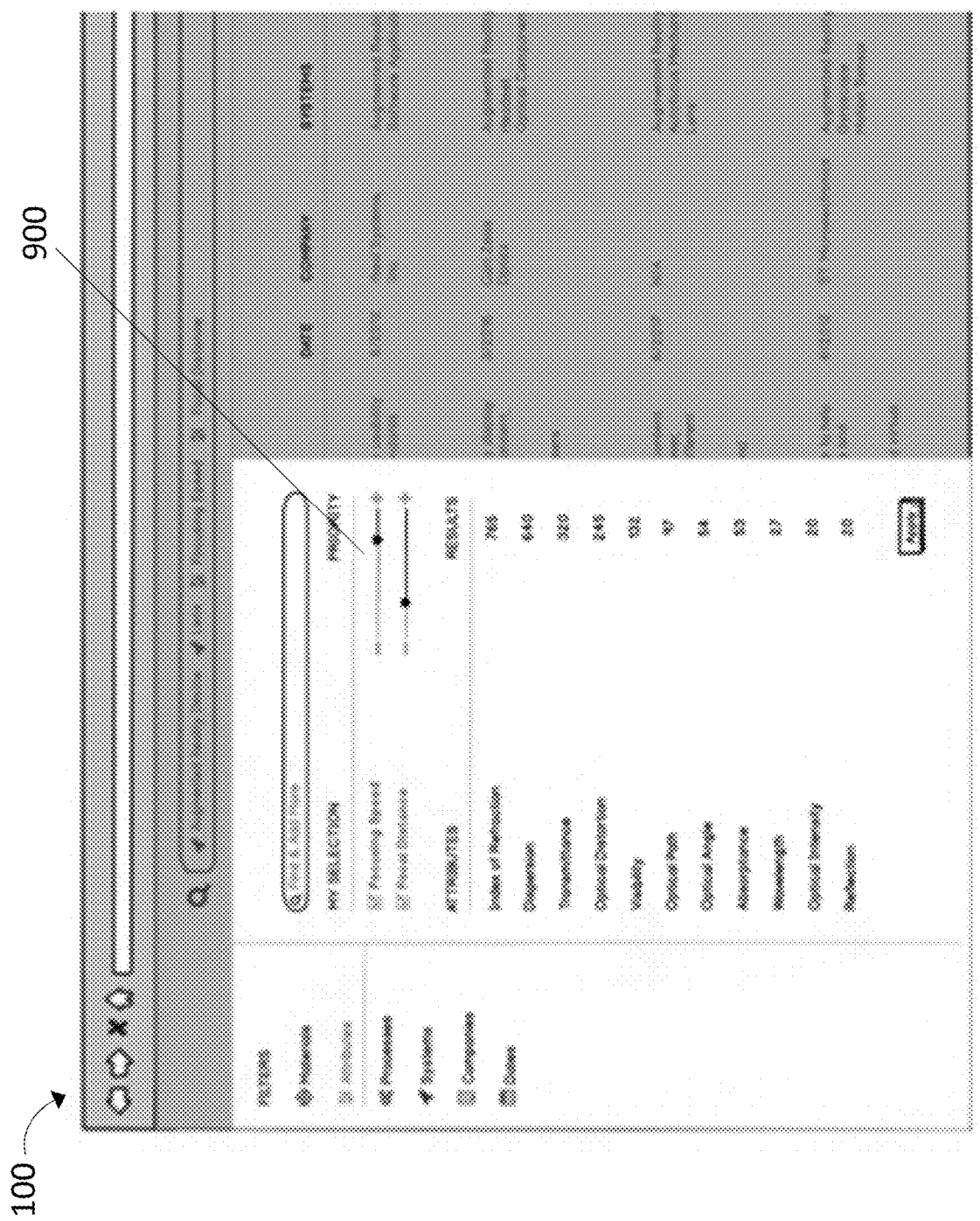
FIG. 9 illustrates an exemplary results weighting slider for modifying results at an exemplary user interface.

In some embodiments, user interface 100 allows a user to weight the importance of selected concepts that they have selected to filter a given results set. FIG. 9 shows selected concepts with slider(s) 900 operable to configure the weighting of each applied concept. Depending on this weighting, the results set is reduced based on the Boolean filter, and in certain embodiments, the weighting may cause the sorting of the results to change boosting the rank of those concepts with a higher weight.

Figure 10:
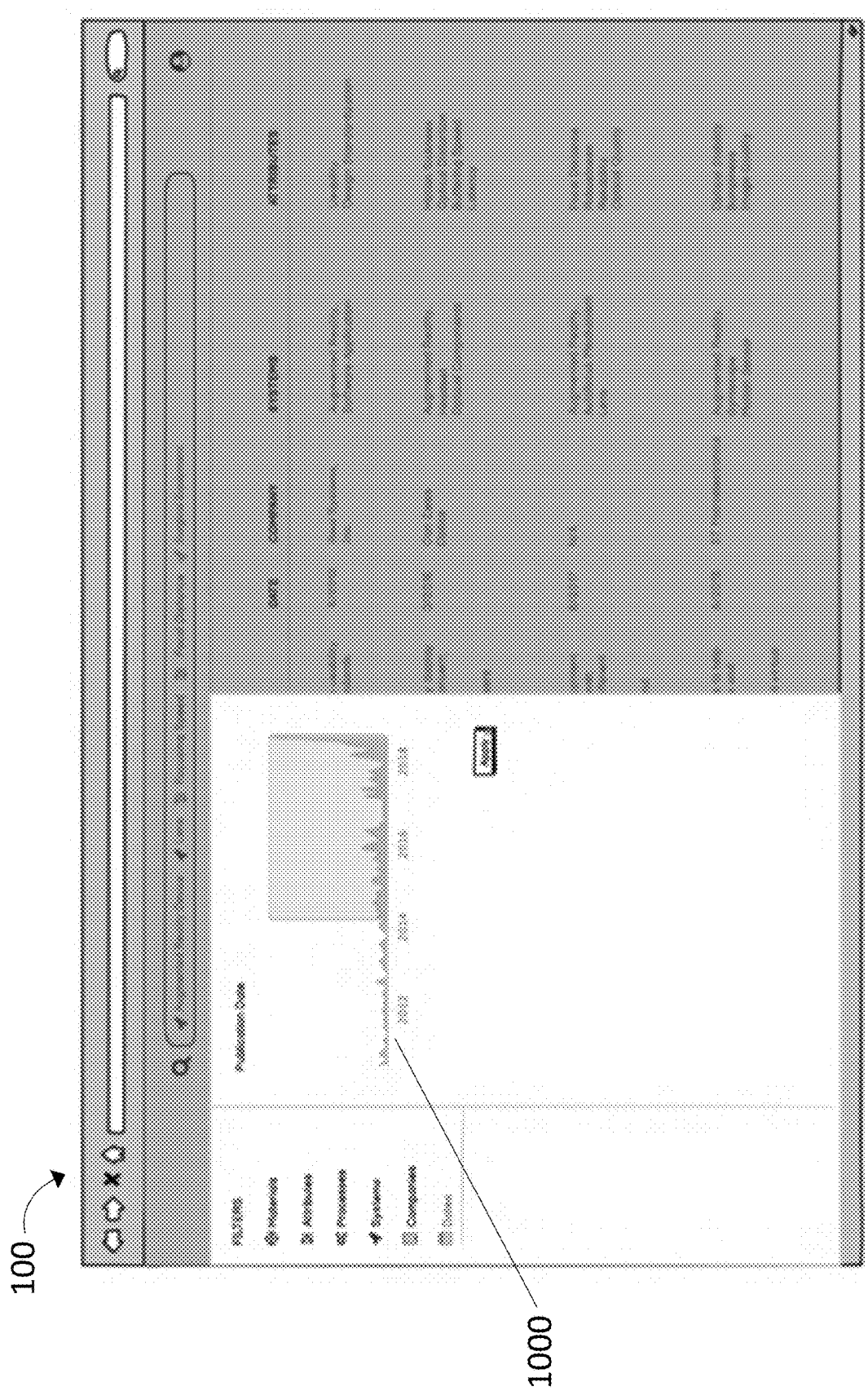
FIGS. 10-11 illustrate exemplary filters for modifying results at an exemplary user interface.

FIG. 10 illustrates a date filter 1000 that can sort results by date. In certain embodiments, date filter 1000 illustrates the amount of results using one or more graphs. In some embodiments, date filter can refine search results by selecting a range on the date filter which would limit results to only those that have been published during the desired time frame.

Figure 11:
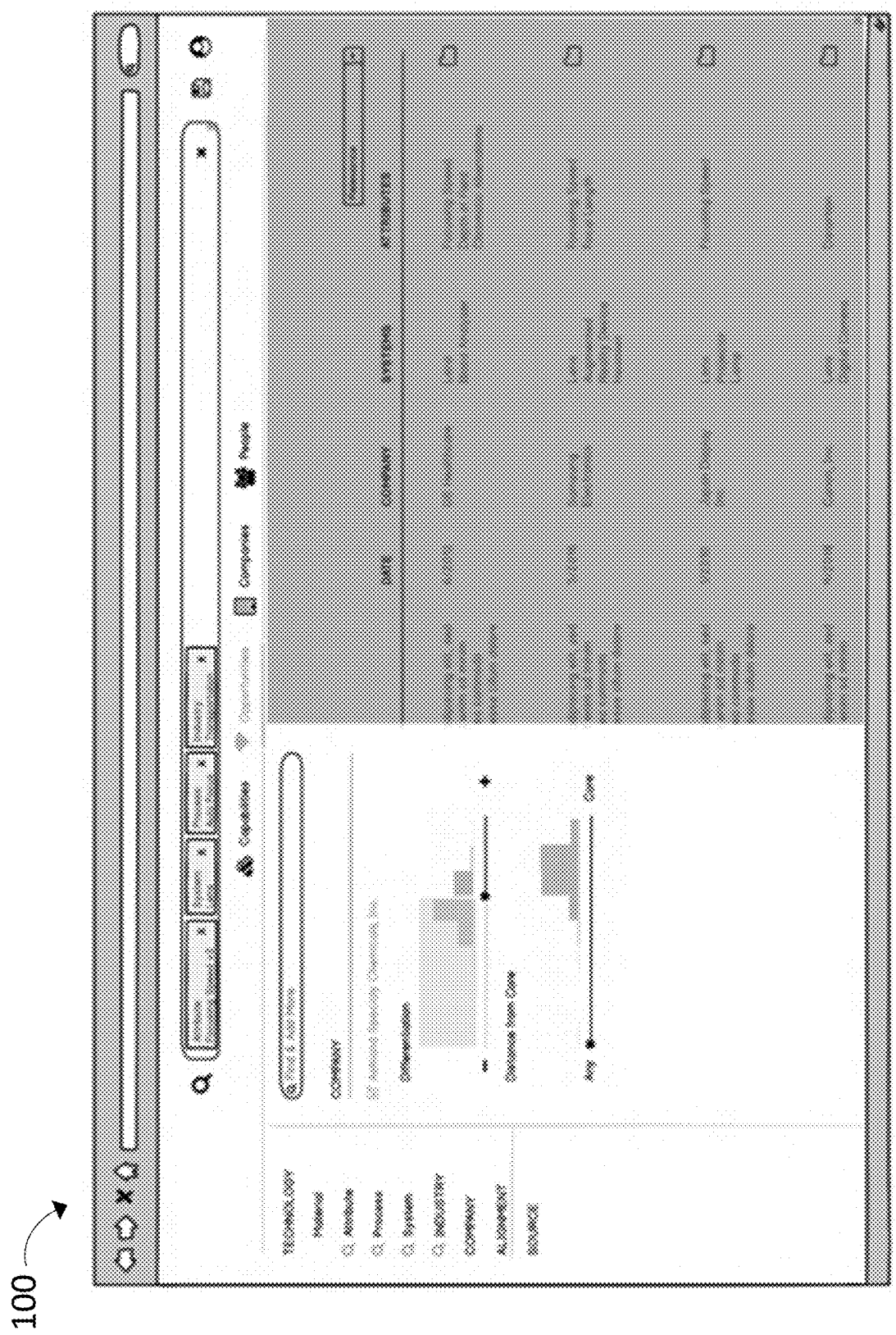

Another filter operable for use with user interface 100 is a company alignment filter. An exemplary company alignment filter is illustrated in FIG. 11. According to certain exemplary embodiments, the company alignment filter allows the user to refine the result by selecting filters related to "alignment" with their company. Users could choose to only view applications, publications, problems, etc. that are close to their "core capabilities" or in areas where their company is truly unique/differentiated vs. other companies. This could be based on either an automated or manual setup of a company profile. A company profile can be used by user interface 100 to show how problems align with different individual aspects of a company's capabilities. For instance, an identified problem kernel may align with the markets or products that the company has experience in, but not the specific components, materials, processes, or characteristics that the company typically focuses on, as identified in the company profile. For instance, if the problem kernel is about electric vehicles, and the company profile indicates that the company does a lot of work in the automotive space, perhaps even in electric vehicles, however, perhaps this particular problem kernel is about the software systems and logic used in electric vehicles and the company focuses on batteries. In this case, it might be considered a strong "market fit" but not a strong technical fit. That could be useful for companies looking to expand into new products in their current markets. However, in an opposite example, perhaps that same company is instead looking for new applications for their battery technology. Perhaps another problem is discussing problems with energy capacity in batteries but it is in a completely different market/product spaces. That problem might be considered high technical fit, because the company knows a lot about how to solve energy capacity problems in batteries, but a low market fit if it is in a brand new/unfamiliar market space. In some embodiments, the user interface 100 builds a company profile based on historical search data and/or user preferences/self-selected profile information.

Other exemplary filters operable for use with user interface 100 include, but are not limited to: a data sources filter configured to allow configuration of types of sources, e.g., patents, scientific journals, trade journals, news, etc.; a time to commercialization filter configured to provide context to results based on the publishing activity across different types of sources, for example, if results are mostly recent and concentrated in scientific journals and patents, the technologies involved may be further away from commercialization than if results span a greater amount of time and are more diverse in the types of results mentioning the topic; a company type filter configured to limit results to specific companies, commercial entities, governments, agencies, universities, etc.

In addition to filters, in some exemplary embodiments, a menu exists for providing different sorting options for the list of results. Options for sorting could include, but are not limited to, Innovation Activity, Problem Intensity, Value Creation Potential, Company Fit, Opportunity, Company Opportunity, Date, Number of Publications, etc. Sorting could be done via either ascending or descending order. An exemplary sorting feature is illustrated in FIG. 26. In some exemplary embodiments, further menus could exist to allow a user customize the weighting of various factors or priorities in a compound metric. For example, they could weight "Novelty" higher than other factors or considerations as a component of "Problem Intensity," or in their "Opportunity" score, they could bias more toward market size or "Value Creation Potential" vs. "Novelty."

Figure 12:
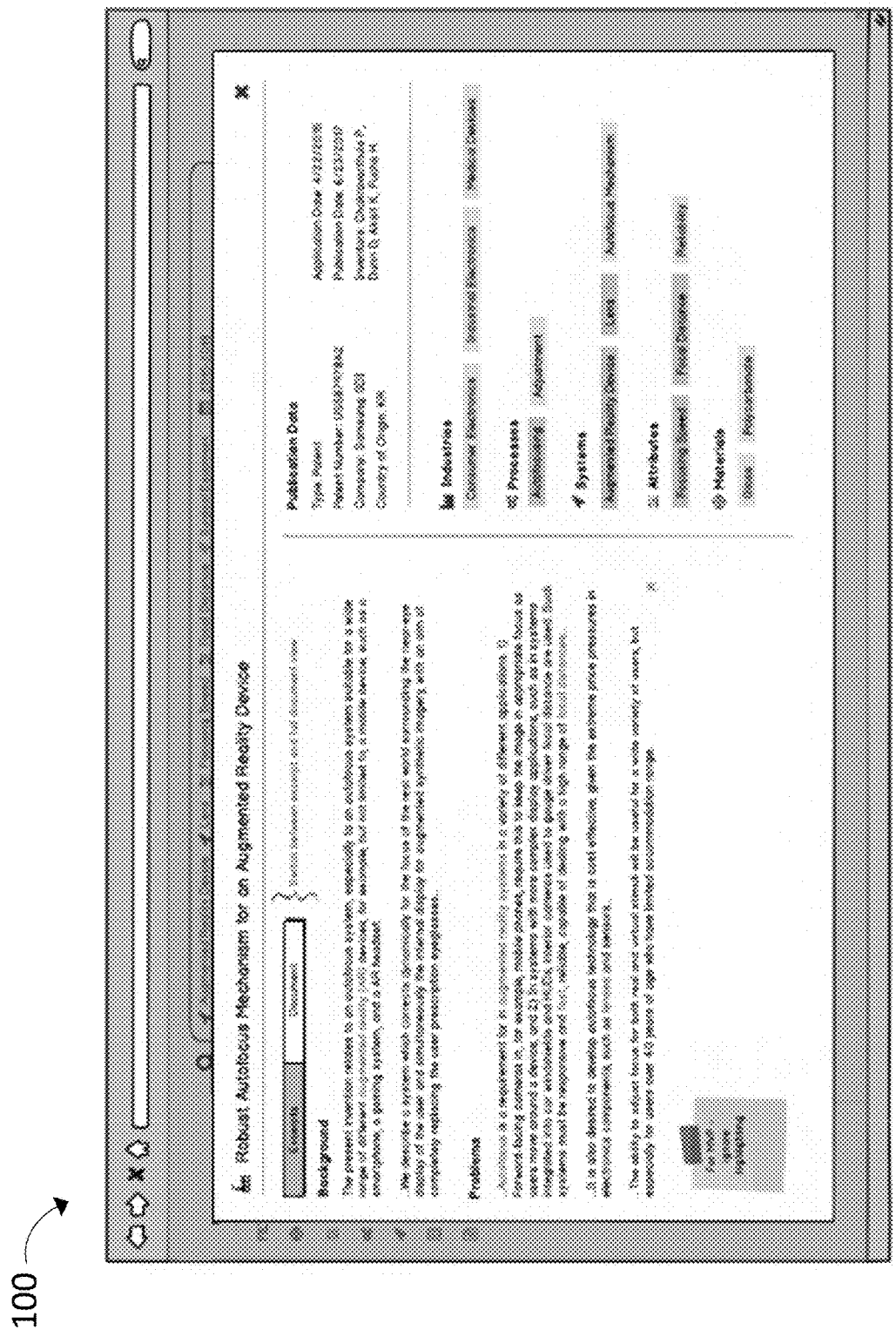
FIGS. 12-14 illustrate an exemplary publication details view of results displayed at an exemplary user interface.
Figure 13:
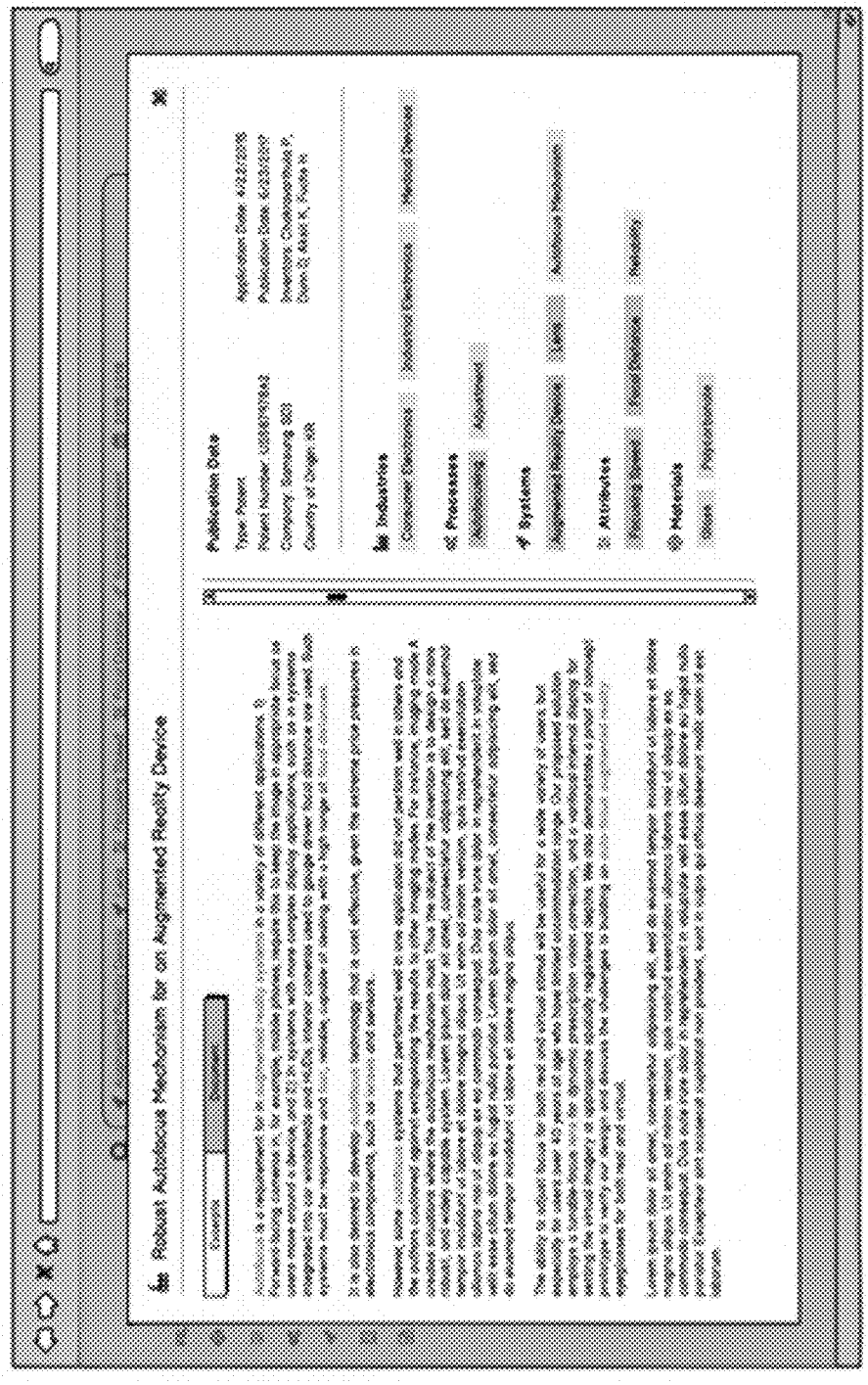
Figure 14:
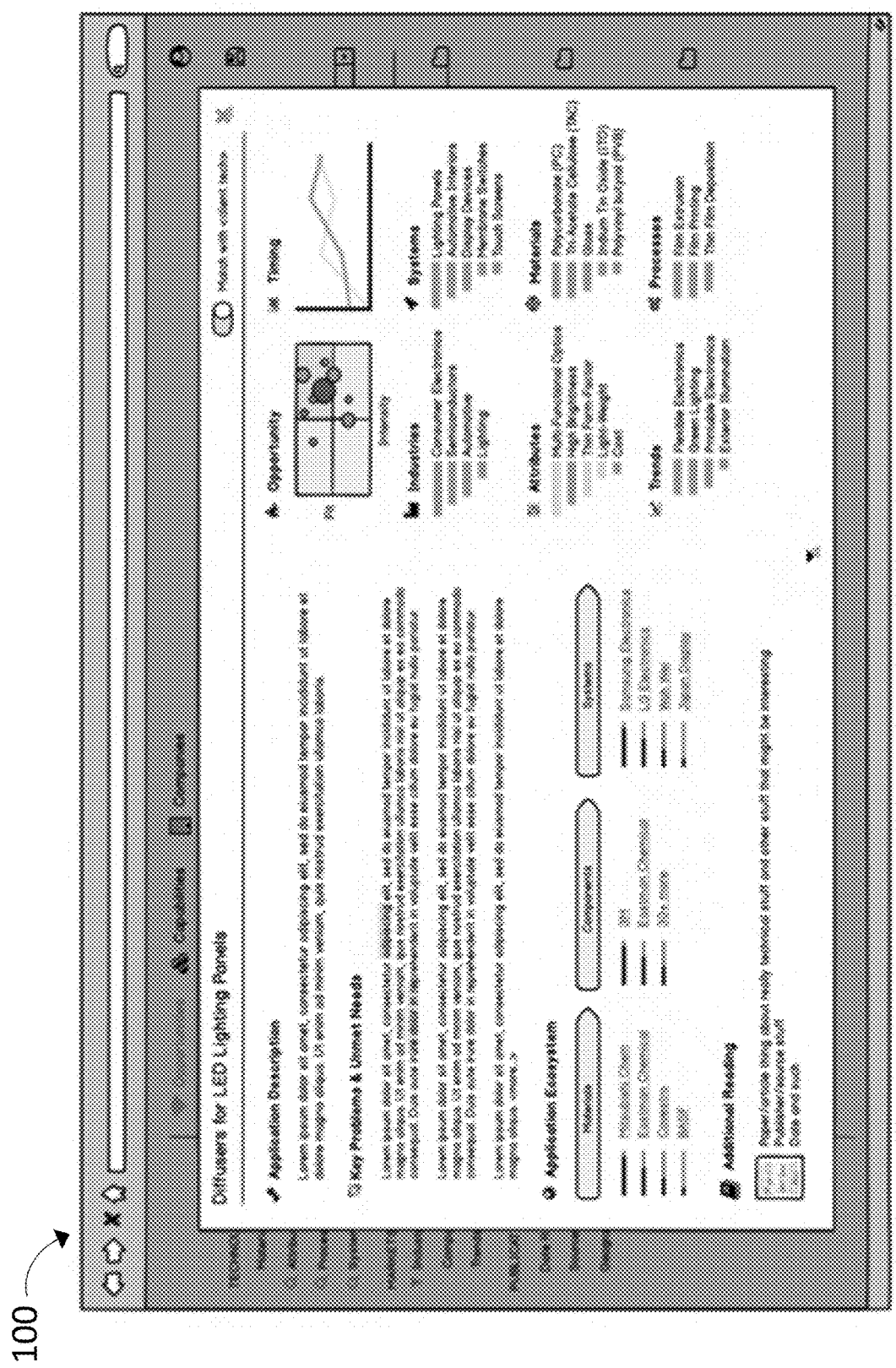
Figure 27A:
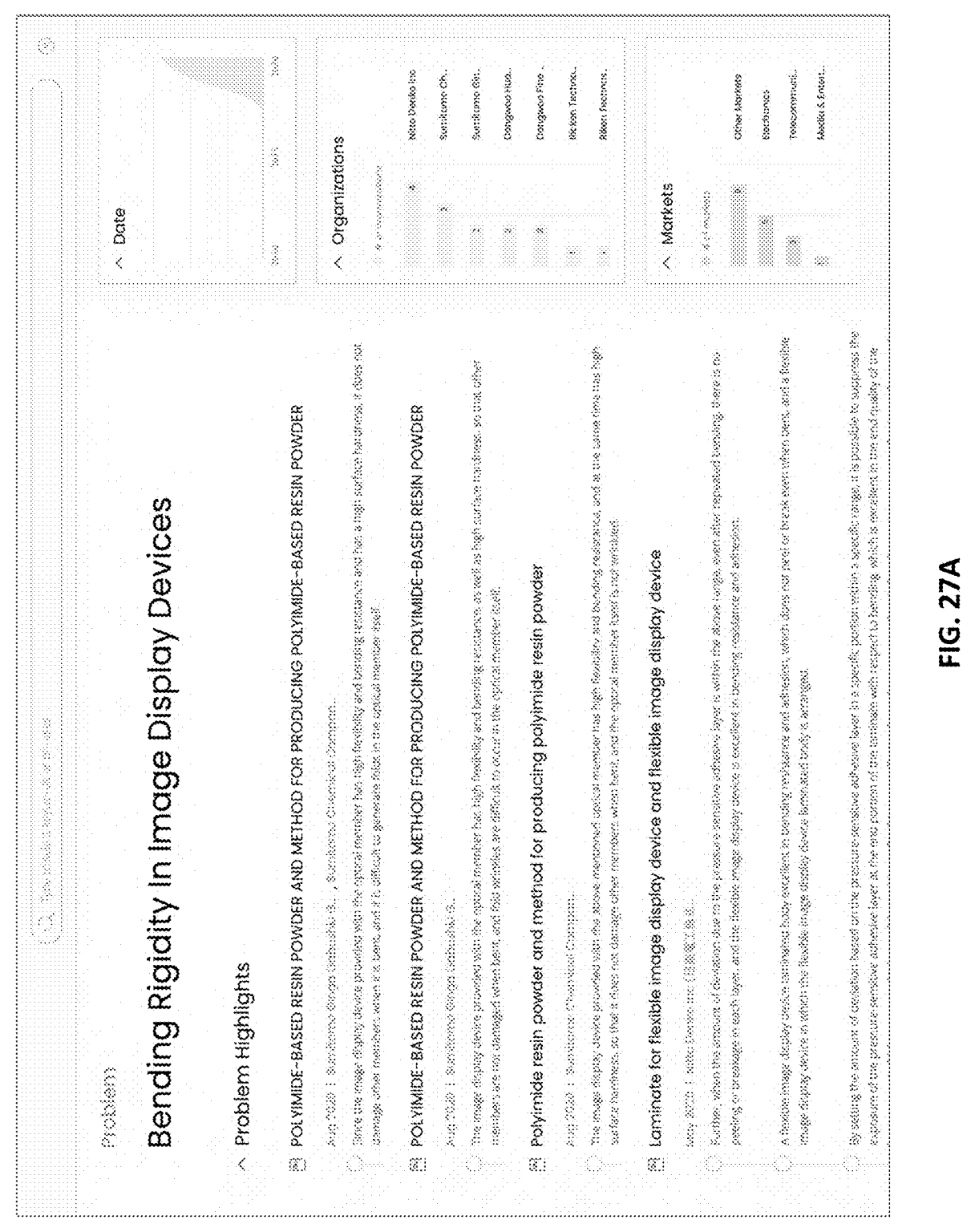
Figure 27B:
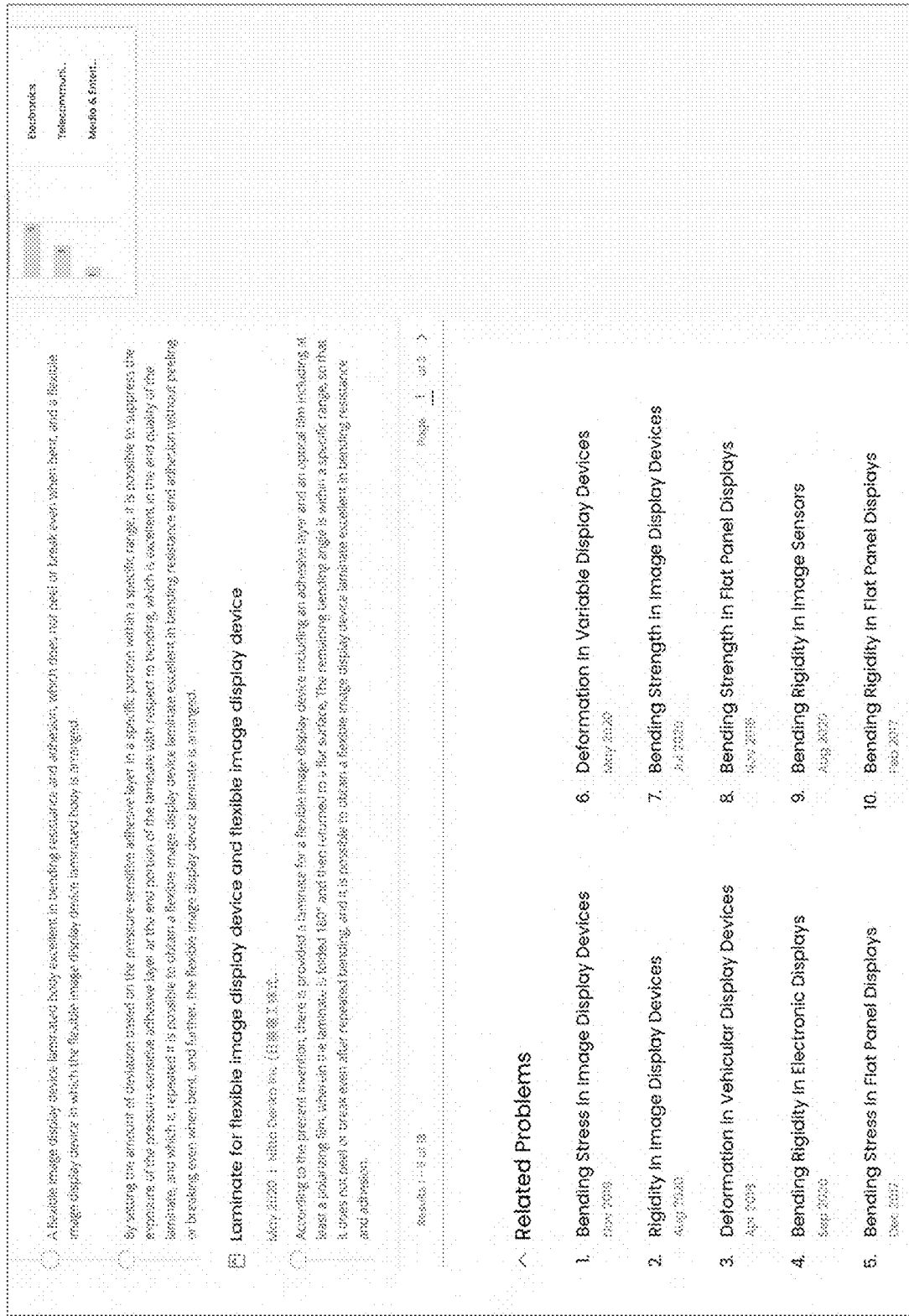
Figure 28:
FIG. 28 illustrates an alternative problem profile view in an exemplary user interface.

FIGS. 12-14 illustrate the publication details view of user interface 100. When the user sees a result that they want to get more information about in the results list, they can click on the result and see a more detailed view of that result (e.g., the publications detail view depicted in FIGS. 12-14). FIGS. 27A-B and 28 illustrate exemplary views of the detail (aka "Problem Profile") view for a given Problem Group. These examples show a title for the Problem Group, along with summary information (e.g., but not limited to publication dates, organizations publishing on the problem, relevant markets), the "Problem Highlights" which are references to individual problem kernels, as well as the individual publications containing them, and potentially related problems. It is appreciated that in certain embodiments, FIGS. 27A-B could be displayed on one screen and/or accessed via scrolling down a single view of the user interface 100. FIG. 28 illustrates one possible embodiment of a details view for a specific application, i.e., a "Application Profile". This example shows a name of the application and illustrative image, a human or machine generated "description" of the application, visual indicators of various scores, such as "Company Fit" and/or "Opportunity", and/or tags, and additional details such as the dates and sources relevant publications, associated trends, an "Ecosystem View" showing related applications, and the associated problems.

If the result was in the form of an individual document/publication (pictured in FIG. 12), the details view would show the title of the publication, metadata about it (e.g., date, document identification numbers, organizations, etc.), as well as tags of the various markets/industries, and technical concepts mentioned. It is also possible for the tags to be highlighted/distinguished based on if they were present in the user's search/filter concepts. If the user clicks on the "excerpts" tab (pictured in FIG. 13), they can see a view of excerpted text that is only relevant to the problems/unmet needs being expressed in the article, or other types of data of interest such as background information being discussed about the application of the problems, rather than having to read through the entire document. If the user clicks on the "document" tab, the user could see the document/publication in a format closer to its original form, potentially with highlights of the key concepts of interest from the search/filters.

As illustrated by FIG. 14, when the user sees a result that they want to get more information about in the results list, they can click on the result and see a more detailed view of that result. If the result was in the form of a problem/unmet need or an application, as aggregated from multiple references to it potentially across many separate publications, they could see a profile of that problem. An exemplary profile could include, without limitation: A title of the that was either automatically or manually created based on its underlying data from individual documents; a brief description/summary of the application/problem, again automatically or manually created; a series of text describing specific needs, problems, etc. in the application or applications related to the problem, comprised of either autogenerated/manually generated summary text, or excerpts of text from the underlying publications; an overview of the various companies related to the problem or application, potentially visualized/ordered by their company type/focus, or position in the supply chain; visualizations showing a time series of activity/publications/mentions of this application/problem, its "problem intensity", and/or fit with the user's/user company's interests or capabilities, as well as how relevant this problem/application is to various industries and technical concepts; links to the underlying source documents/publications, which could either take the user to a partial/full-text view of that publication in the tool, or link to it in an external source.

Figure 15:
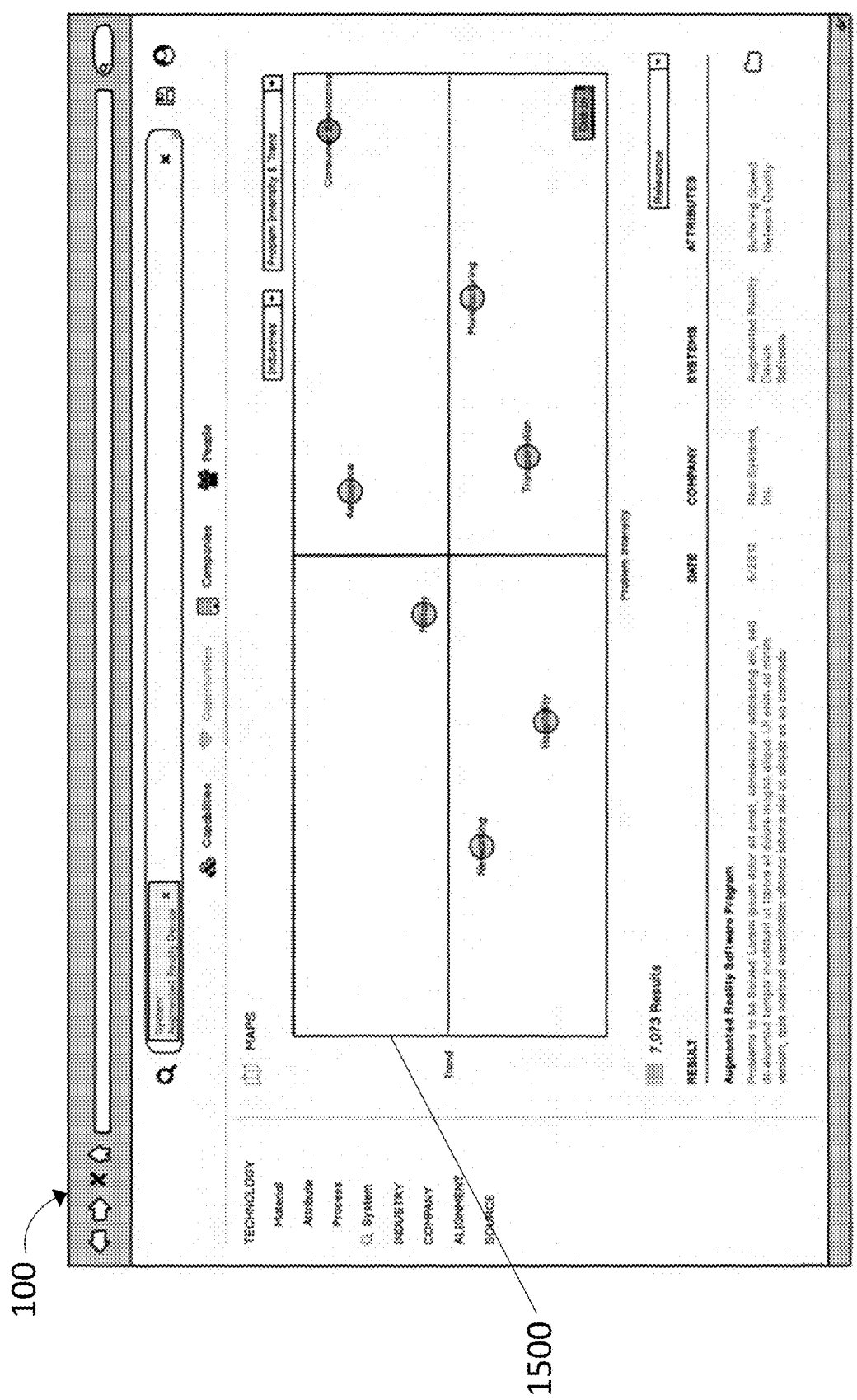
FIGS. 15-17 illustrate various exemplary interactive visualizations displayed at an exemplary user interface.

User interface 100 is further configured to generate and display interactive visualizations based on the search results. An exemplary interactive visualization 1500 is illustrated in FIG. 15. Interactive visualizations 1500 can be flexible to show various categorical or time series data in a variety of formats. For instance, a user could visualize which industries/markets are covered in the problems/applications/documents related to their search of, e.g., "augmented reality systems." In other words, where are augmented reality devices used and where are there the biggest problems? Other types of data could be visualized, as well, such as the companies/organizations, the technologies, etc. The user could visualize these markets on a variety metrics, such as things like "trend", "mentions", or "problem intensity,", among other metrics, and display them in various chart formats, etc., scatter plots, bubble charts, pie charts, etc. The user could then interact with such charts within user interface 100 by, for instance, clicking on a bubble/data point, and either filtering the results by that concept, or drilling-into the concept further to re-render the visualization with the child concepts under that concept, e.g., seeing the sub-markets under "consumer electrics" where "augmented reality devices" are being used.

Figure 19:
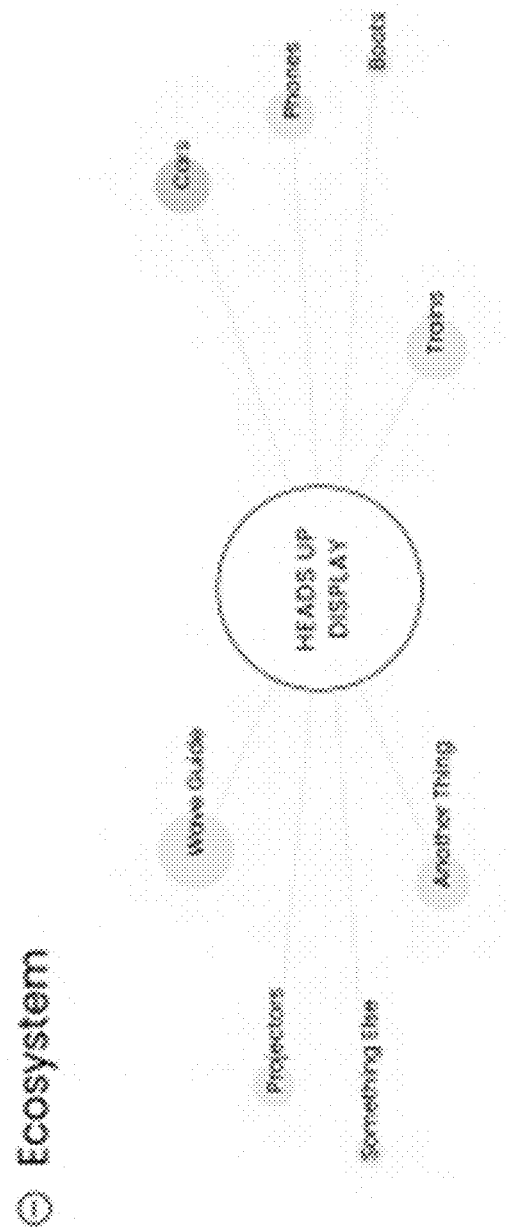
FIGS. 19-24 illustrate various exemplary interactive visualizations displayed at an exemplary user interface.
Figure 20:
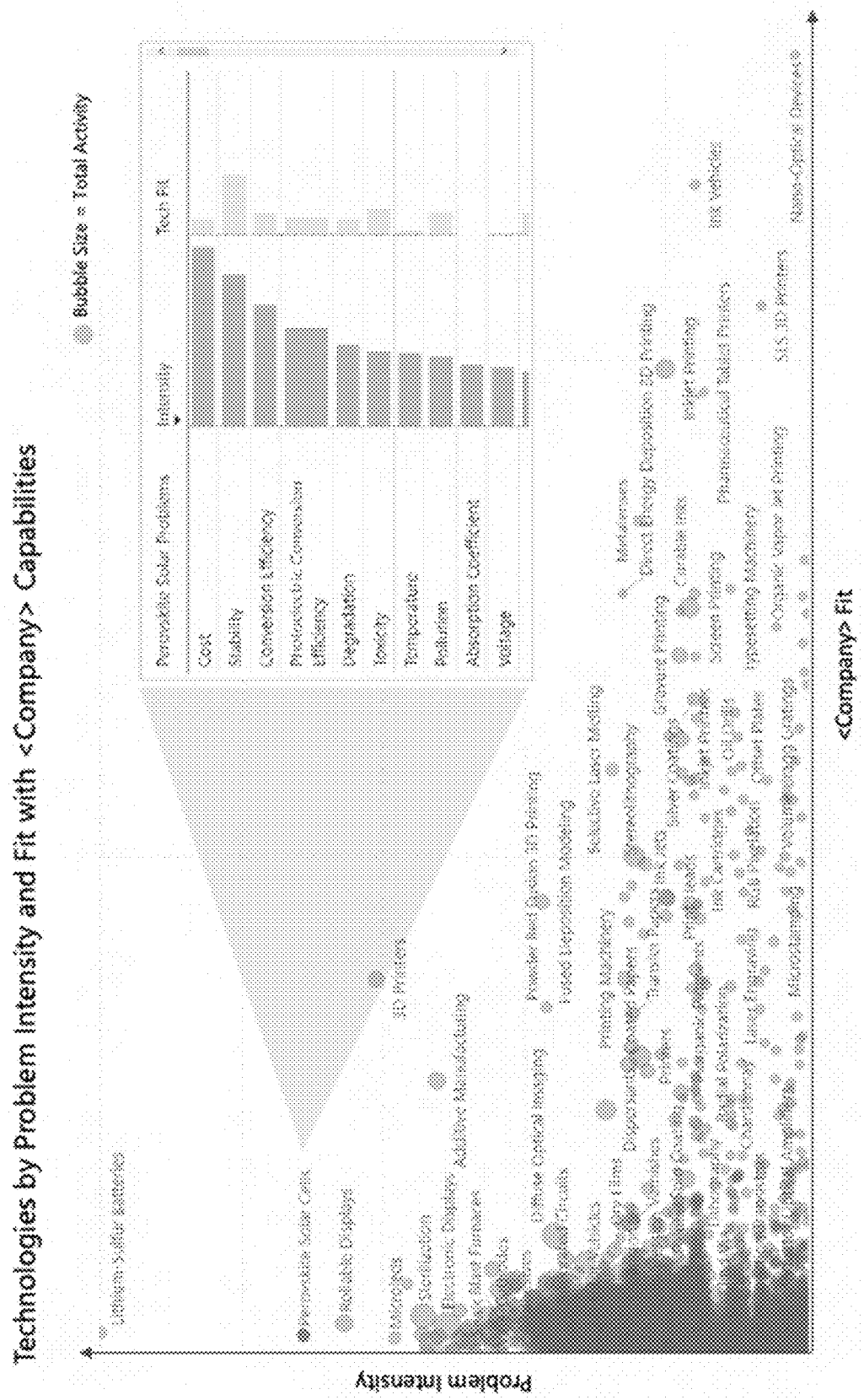
Figure 21:
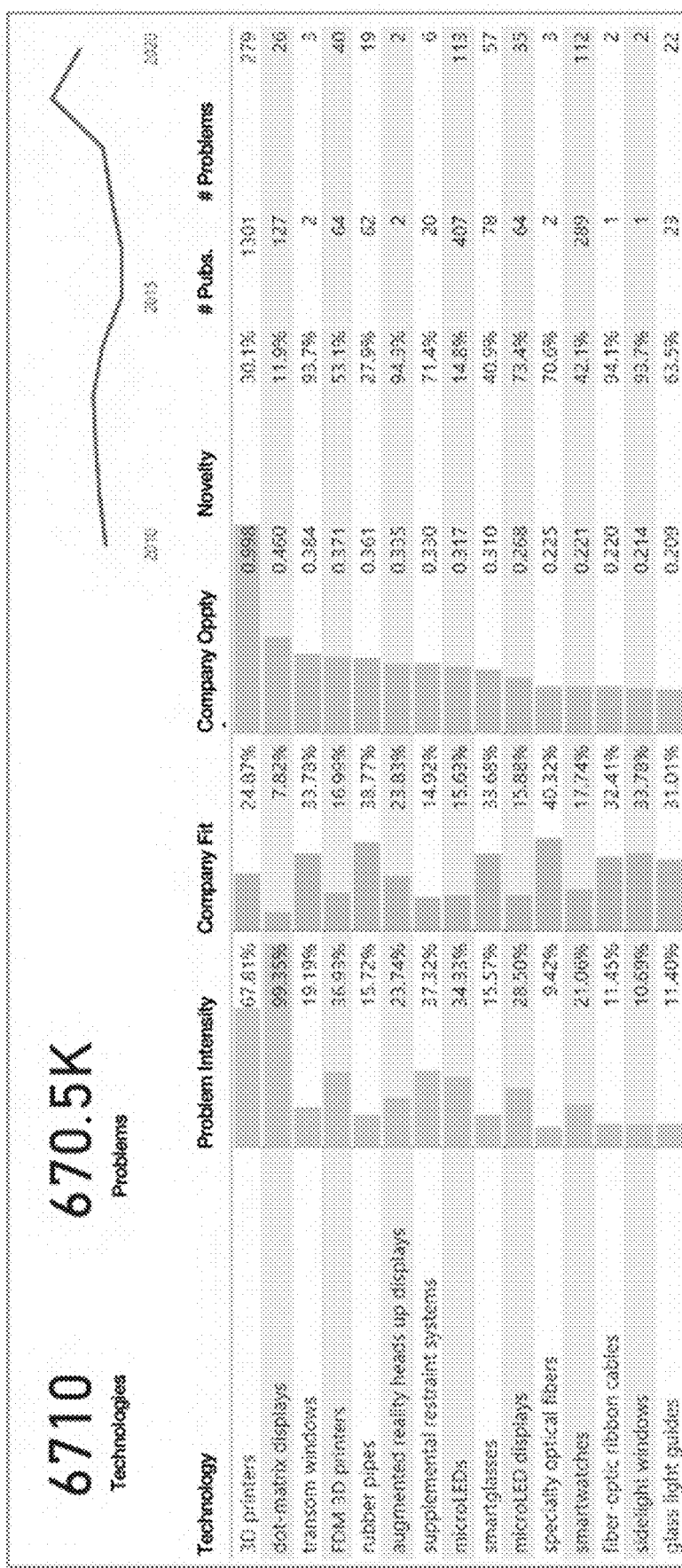

Additional interactive visualizations are shown in FIGS. 19-24. FIG. 19 illustrates an Ecosystem Network Visualization that shows technologies related to a given technology of interest, for example, a "heads up display." FIG. 20 shows a Bubble and Bar chart that illustrates technologies on the chart and which technologies have the highest problem intensity and company fit. In certain embodiments, a user interacting with the Bubble and Bar chart in user interface 100 can click on a technology and user interface 100 will further display specific problems along with their problem intensity and technological fit. FIG. 21 shows a dashboard overview of technologies combining multiple exemplary metrics and visualization types. Clicking on any technology could display problems associated with that technology.

Figure 22:
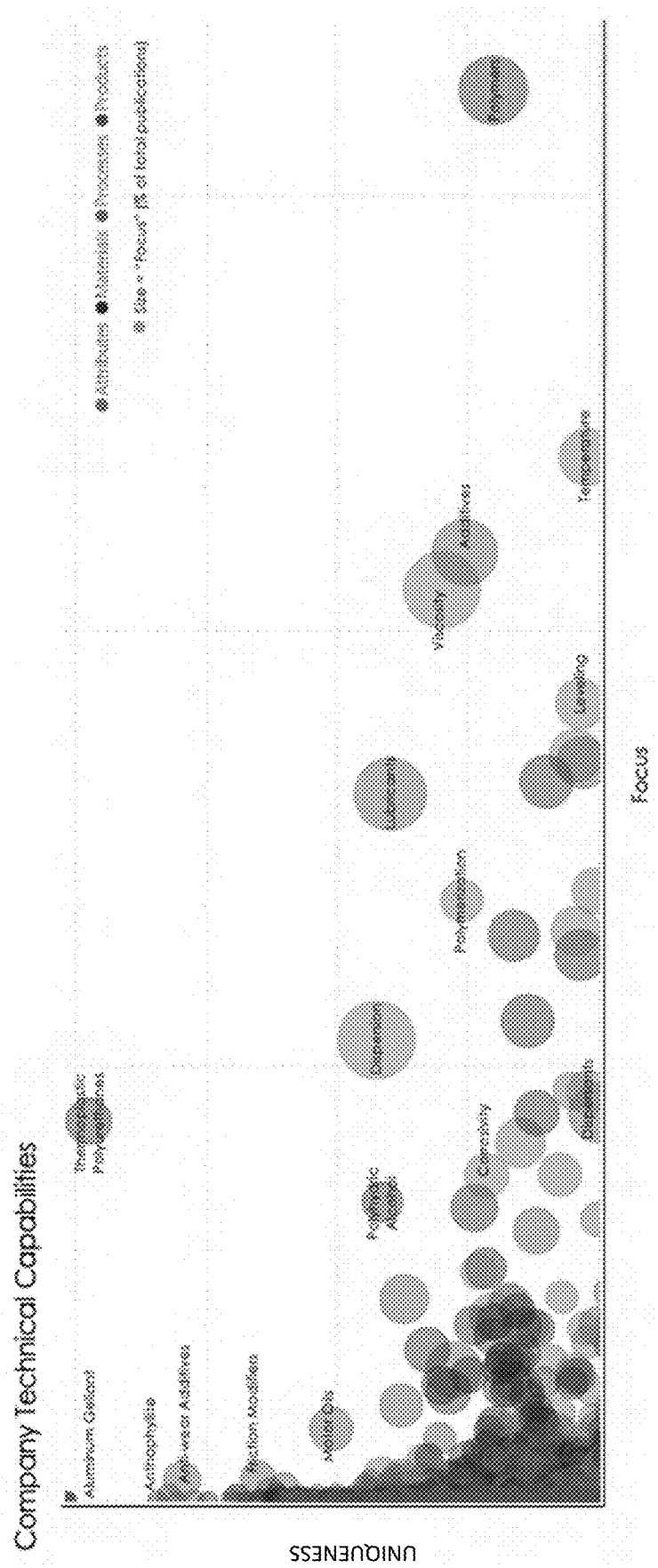
Figure 23:
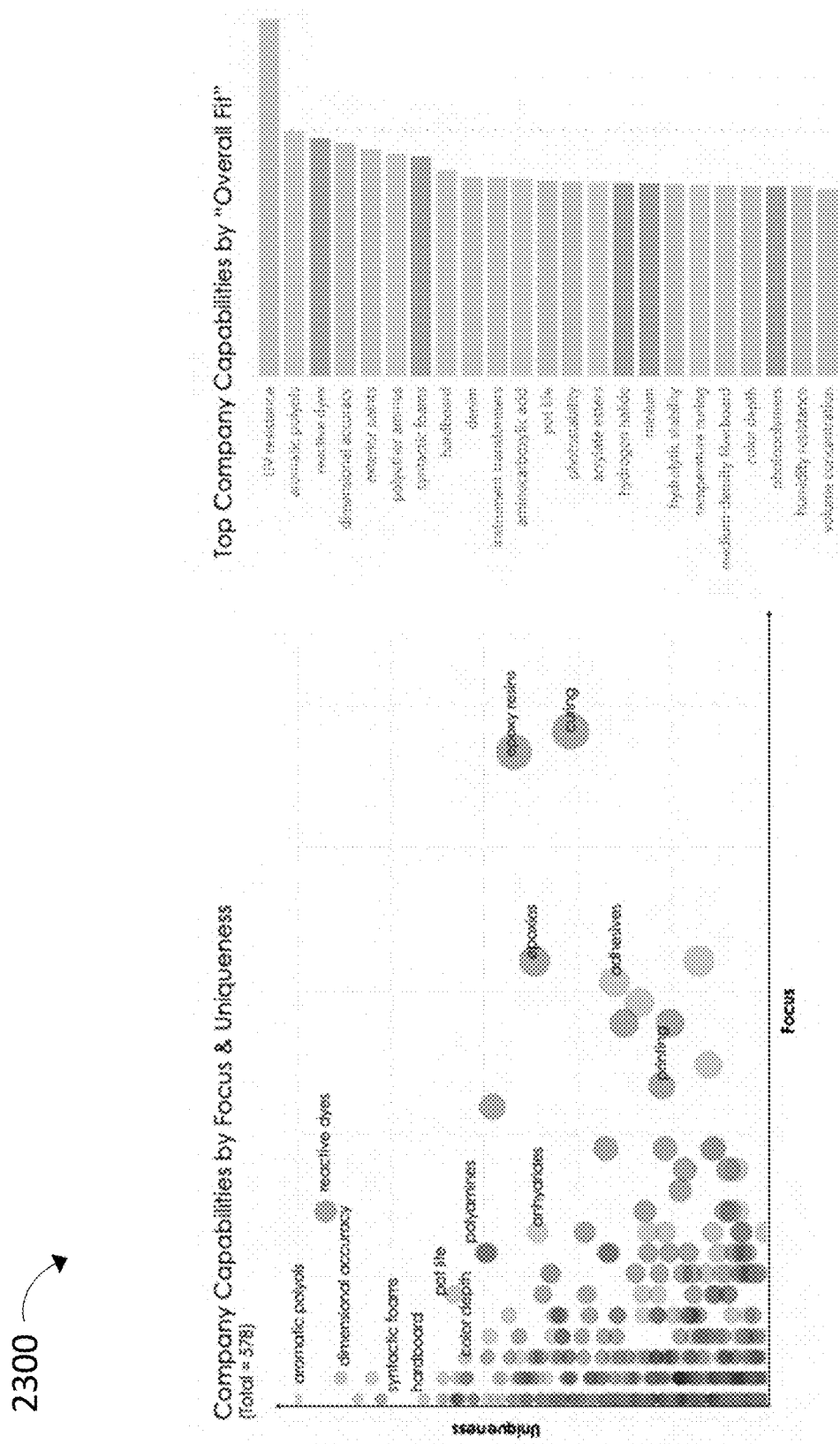

FIGS. 22-23 show various visualizations related to company capabilities. As described herein, capabilities of a company (e.g., associated with a user of user interface 100) can be assessed using the tools associated with user interface 100. In certain embodiments, company capabilities are determined by only looking at documents from or associated with that company. It is also appreciated that company capabilities could be determined for other companies by similar limiting of the analyzed document universe to only include documents from or associated with that company. FIG. 22 shows company technical capabilities as a function of focus and differentiation. Focus can be measured analyzing the relative frequency a given concept or technology appears in a company's documents. Focus can also be determined via "centrality" of a technology in a network graph analysis. Differentiation can be determined by comparing how strong the company is in a particular technology relative to other companies around the world. In certain embodiments, this is determined, at least in part, based on the technical capability score as described herein.

Figure 24:
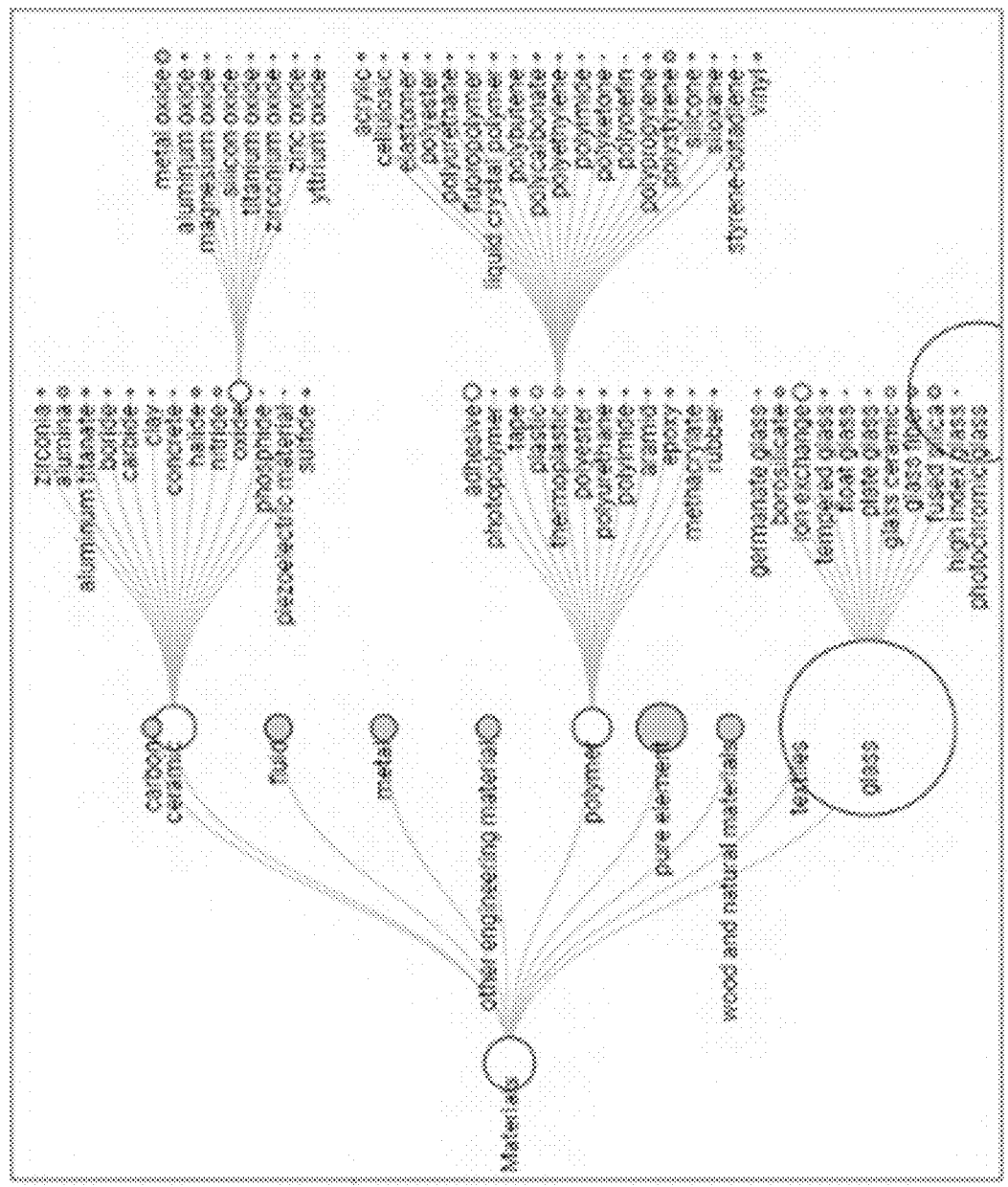

As shown in FIG. 23, bubble chart 2300 illustrates a company's capabilities as a function of focus and uniqueness within the company. Uniqueness can be measured by comparing a selected search term, concept, technology, etc. to with other technologies associated with the company. Uniqueness can also be weighted according to how important a particular concept or technology is to the company's overall product offering. Focus can be measured analyzing the relative frequency a given concept or technology appears in a company's documents. In certain embodiments, uniqueness and focus can be derived, for example, from a company profile as described herein. FIG. 23 also illustrates a visualization ranking all company capabilities according to "overall fit." In some embodiments, "overall fit" is measured using uniqueness and focus as a combined metric. FIG. 24 shows a tree view of company capabilities. The tree view shows a company's capabilities in various area and allows for a visual representation of the relationship between more specific related capabilities and the broader capabilities that enable them.

Figure 16:
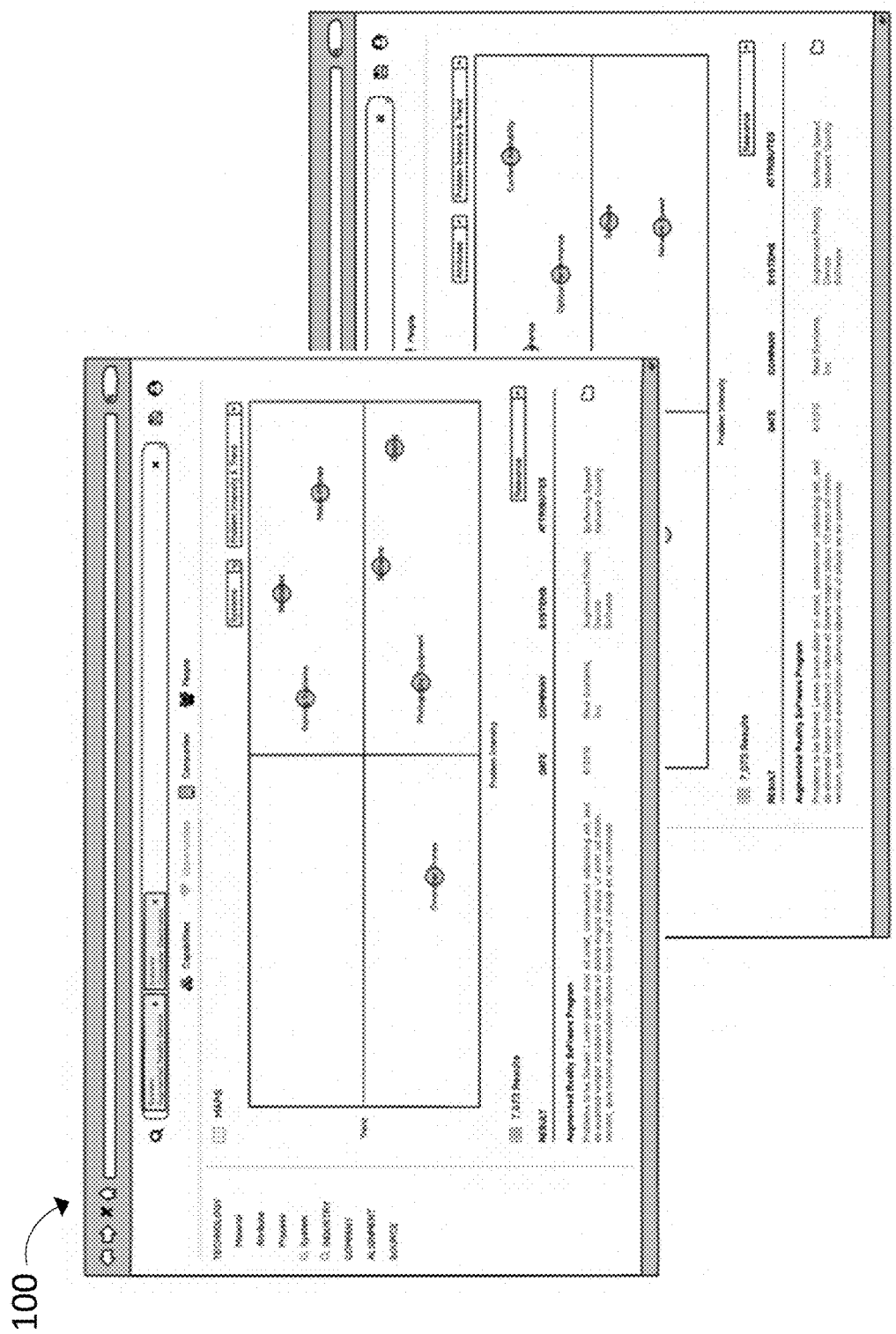
Figure 17:
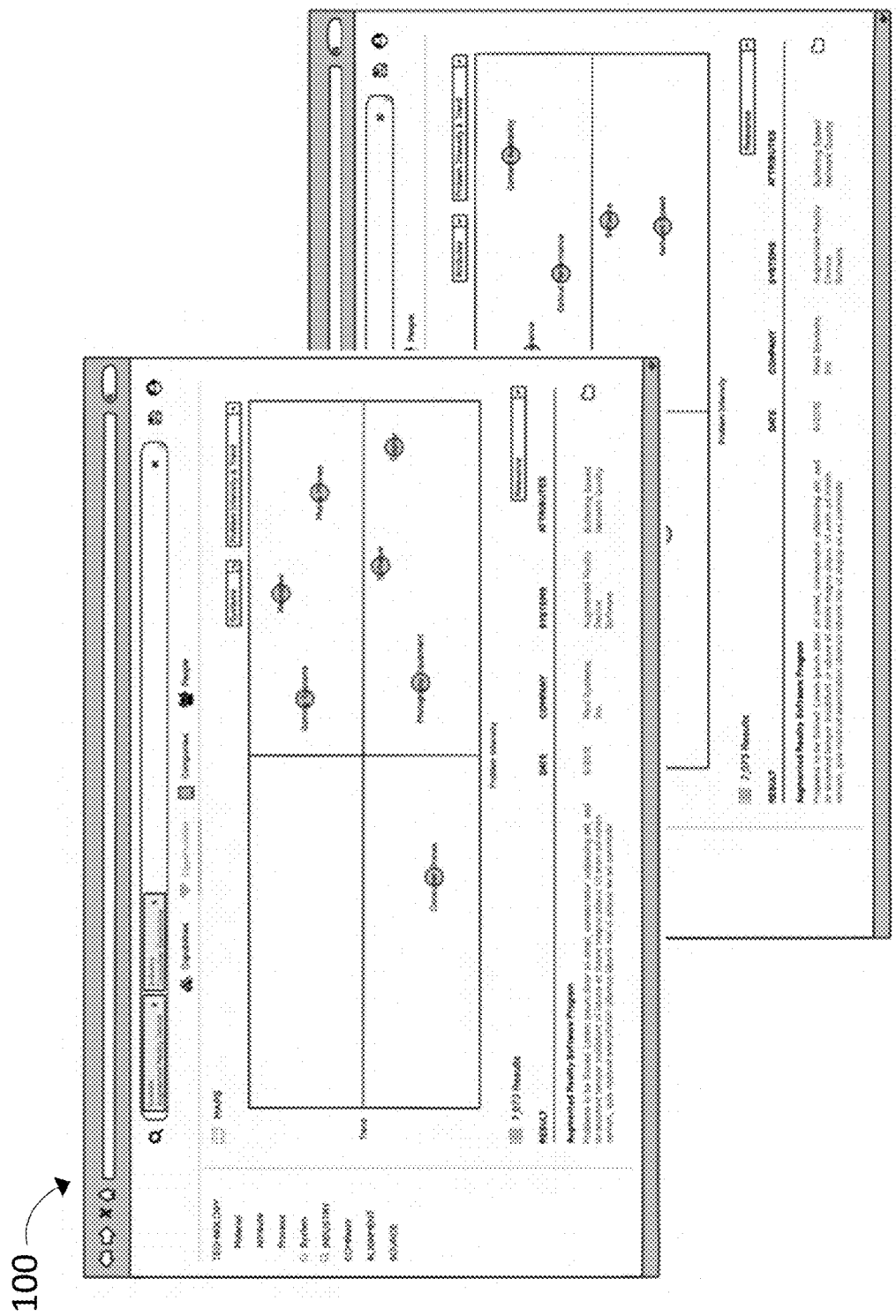
Figure 32:
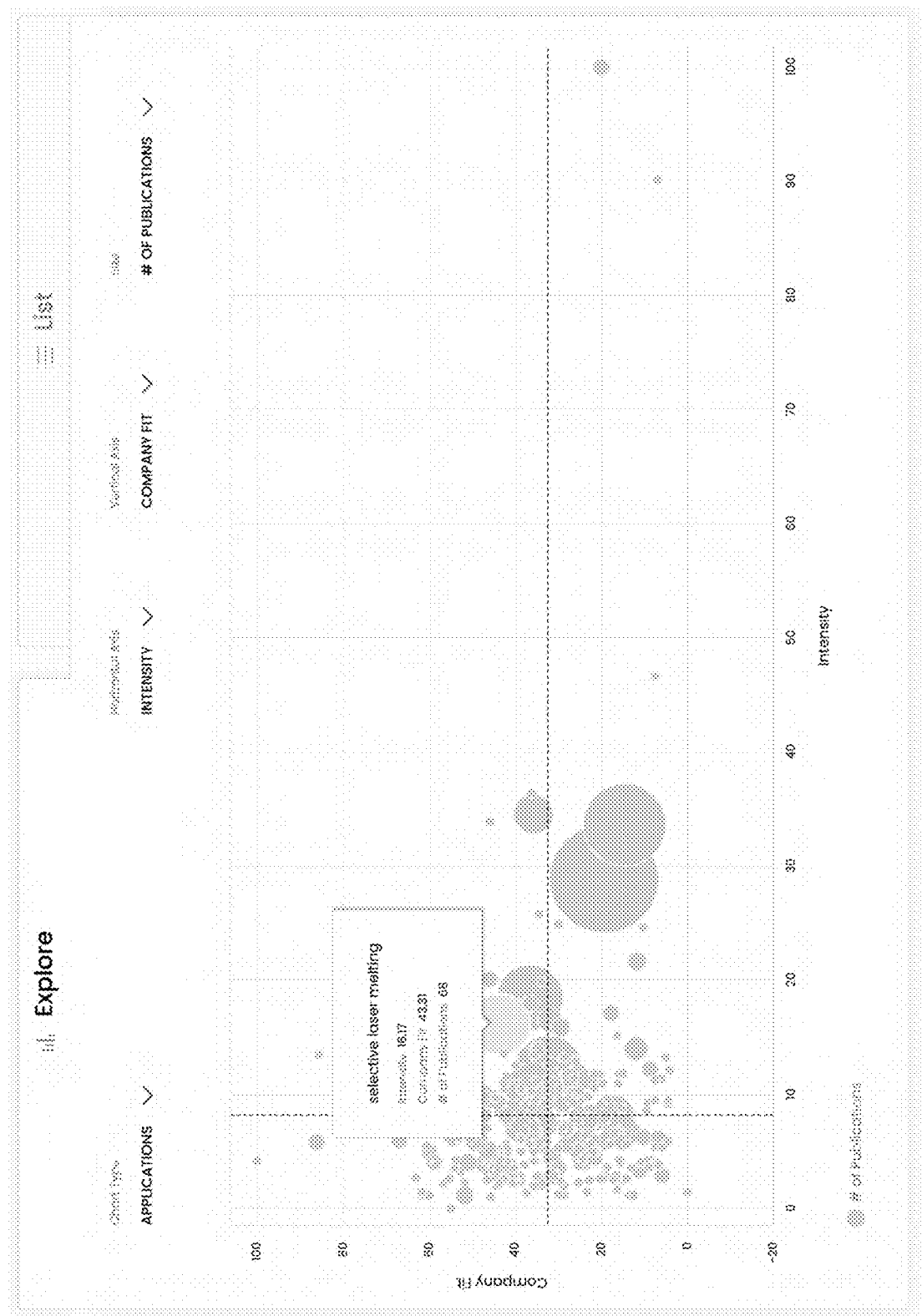
FIG. 32 illustrates an exemplary interactive visualization in an exemplary user interface.

Additional interactive visualizations are contemplated. For example, a bubble chart of the key systems/products related to "augmented reality devices" in "consumer electronics" (illustrated by FIG. 16), a view of the key attributes being focused on related to such augmented reality devices, e.g., "content availability", "optical distortion", etc. (illustrated by FIG. 17), (Not pictured) Similar data to the above can be shown in the chart format of a bar/column, pie/donut, Sankey, circlepack, mekko, etc., a time series chart of either the overall data, or various categories of data. An additional interactive visualization showing the relationship between company fit and problem intensity for a number of technology elements is illustrated in FIG. 32.

Figure 18:
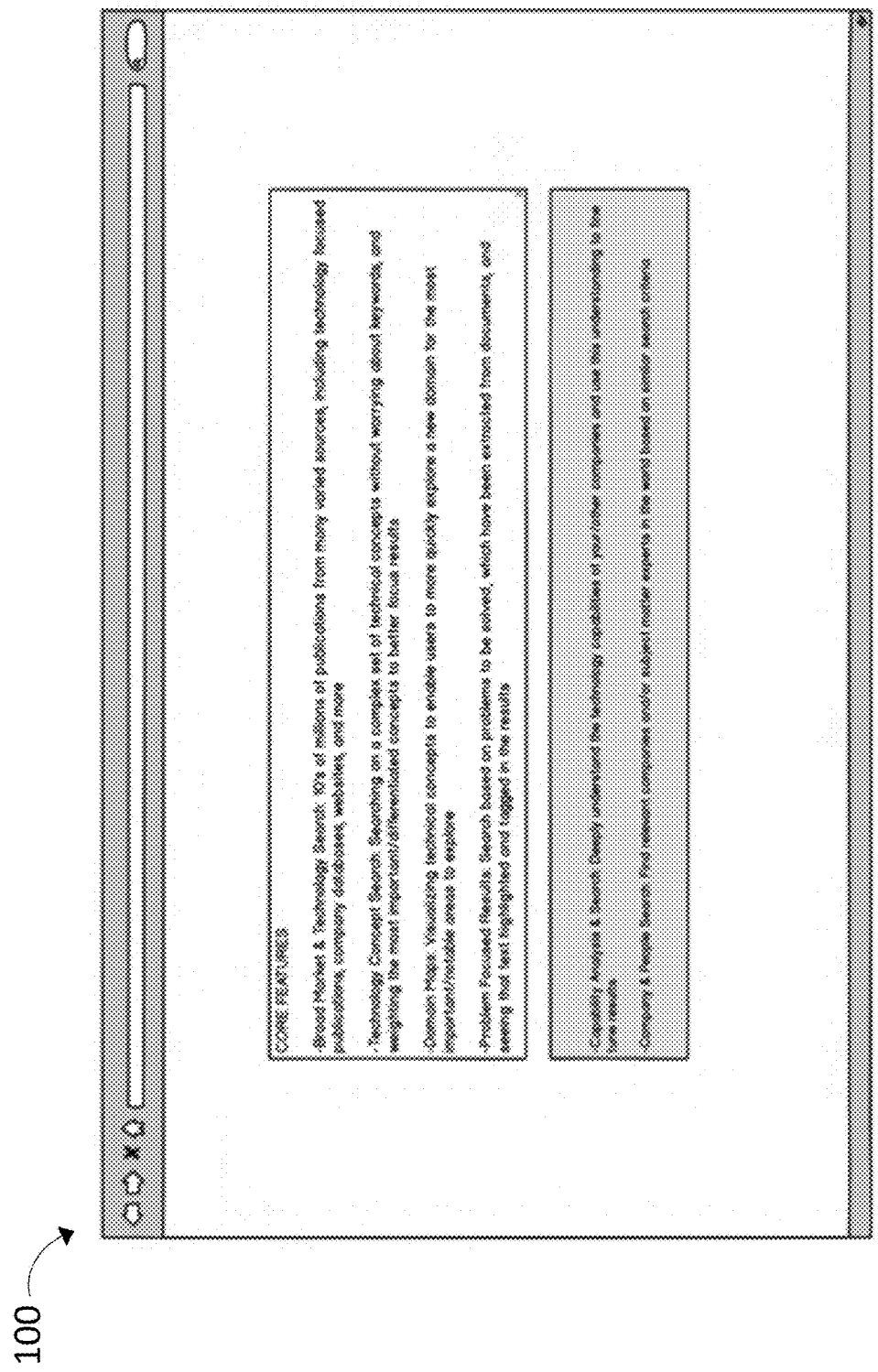
FIG. 18 illustrates and exemplary view of a capability analysis displayed at an exemplary user interface.

In certain embodiments, user interface 100 is configured to search and analyze capabilities related to a user or company profile. An exemplary display of results of such a capabilities analysis are illustrated by FIG. 18. In some embodiments, further features related to Capability Analysis and Improved Search are contemplated. In some embodiments Capability Analysis and Improved Search performed by user interface 100 may comprise: an automated analysis of public of non-public, internal documents using heuristics and AI models to extract and analyze your company's/organization's capabilities, markets served, strategies, etc. from the text and represent them to the user, and/or a manual process where either the user or an assistant to the user identifies the key capabilities and markets and inputs them into the tool, the tool could represent those capabilities inputted/extracted to the user in a "capability analysis", that could show things such as: which capabilities the organization possesses based on their presence in the documents or inputs; which ones are the organization is most focused on based on amount of activity or similar; which ones are most "core" or "central" to the organization based on various measures of coreference or other relationship centrality; which ones are most "unique" or "differentiated" vs. other companies, potentially even against a finite set of core competitors; which ones are most recent/new or "trending" via increasing or decreasing activity over time; which capabilities are currently specific to certain markets that the company serves; the tool could then allow the user to potentially edit or refine such capability representations to, for instance, name or organize certain capabilities or clusters of capabilities according to internally-referenced names or organizational structures. The tool could then use this capability information to allow the user to perform searches of the external world for applications and problems/unmet needs that specifically match with their capabilities, either in aggregate, or focusing on specific individual capabilities or groups of capabilities. The tool could also use this capability information to represent the results of any search based on their relation to the company's capabilities, such as via a "capability fit" metric that could be used for visualizations or as an option for sorting a list of results, or as a Boolean filter to refine the results and only show those that have a specified relation to the organization's capabilities.

In some embodiments, further features related to "Company and People Search" are contemplated: In certain embodiments, the user can focus the search on finding specific companies/organizations instead of new applications or market needs. The user could search for a specific problem, technology, market, etc. and then see the companies or individuals that are most relevant to that space. Organization results could be in the form of organization profiles, similar to those you would find in popular company database tools like Crunchbase, Pitchbook, etc. However, rather than just displaying general descriptions of the companies or financial characteristics, results could show specifically what companies are doing related to a specific market, and what their unique capabilities are that are related. A user could also see which companies/organizations/people are most similar or complementary to the capabilities, markets, and interests of their organization via filtering, sorting, and visualizations.

Figure 25:
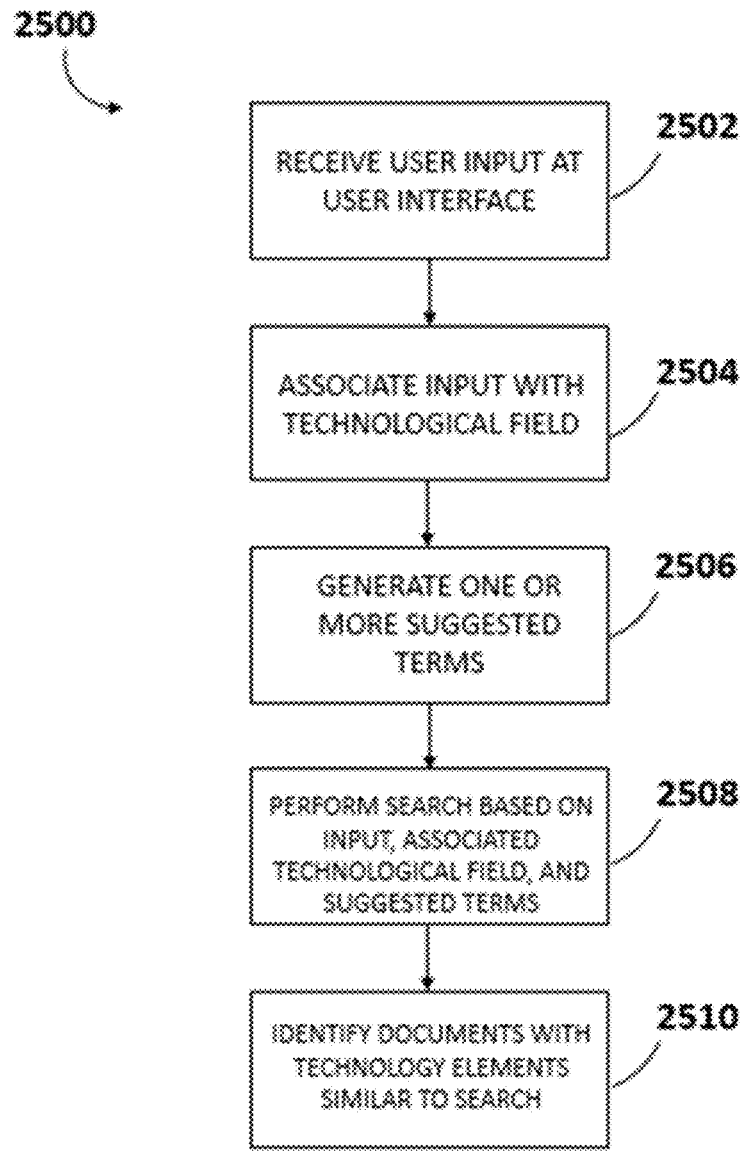
FIG. 25 illustrates a flow chart of an exemplary method.

FIG. 25 illustrates the steps of an exemplary method 2500 as described herein. At step 2502 user input is received at a user interface (e.g., user interface 100). At step 2504 input is associated with a technological field. At step 2506, one or more suggested terms are generated based on the input and its associated technological field. It is appreciated that suggested terms may be generated based on partial user input and displayed at the user interface to inform the present search. In some embodiments, the suggested terms can be associated with the technological field based on technological concepts related to the technological field. At step 2508, a search is performed based on the input, the associated technical field, and selected suggested terms. At step 2510, the method identifies documents with technology elements similar to the search. In some embodiments, a technical capability score is generated based on an analysis of the identified documents.

Some of the steps, acts, and other processes and portions of processes are described herein as being done "automatically." In the alternative, or in addition thereto, those steps, acts, and other processes and portions of processes are done with one or more intervening human acts or other manual acts that eventually trigger the mentioned step(s), act(s), and/or other process(es) and/or process portion(s).

While the present invention has been illustrated by the description of embodiments thereof, and while the embodiments have been described in considerable detail, it is not the intention of the applicants to restrict or in any way limit the scope of the invention to such details. Additional advantages and modifications will readily appear to those skilled in the art. For example, the computers 20, 22, 23, 24, and/or computers 14, 16 can be modified to include logic to perform any one or more of the various functions and processes herein. As another example, the steps of all processes and methods herein can be performed in any order, unless two or more steps are expressly stated as being performed in a particular order, or certain steps inherently require a particular order. As yet another example, streams of data, e.g., live audio data from a microphone or pre-recorded audio data in an audio recording or a video recording, can be analyzed using any of the various methods described herein. Accordingly, departures may be made from such details without departing from the spirit or scope of the applicant's general inventive concept.

The term "module" or "engine" used herein will be appreciated as comprising various configurations of computer hardware and/or software implemented to perform operations. In some embodiments, modules or engines as described may be represented as instructions operable to be executed by a processor and a memory. In other embodiments, modules or engines as described may be represented as instructions read or executed from a computer readable media. A module or engine may be generated according to application specific parameters or user settings. It will be appreciated by those of skill in the art that such configurations of hardware and software may vary, but remain operable in substantially similar ways.

It is to be understood that the detailed description is intended to be illustrative, and not limiting to the embodiments described. Other embodiments will be apparent to those of skill in the art upon reading and understanding the above description. Moreover, in some instances, elements described with one embodiment may be readily adapted for use with other embodiments. Therefore, the methods and systems described herein are not limited to the specific details, the representative embodiments, or the illustrative examples shown and described. Accordingly, departures may be made from such details without departing from the spirit or scope of the general aspects of the present disclosure.

What is claimed is:

1. A computer implemented method for analyzing documents, the method comprising:
   receiving an input from a user via a user interface;
   associating the input with a technological field;
   generating one or more suggested terms associated with the technological field, wherein the one or more suggested terms are based on technological concepts related to the technological field;
   displaying the one or more suggested terms at the user interface;
   receiving a selection of the one or more suggested terms;
   analyzing documents in a document database to identify documents having one or more technology elements based on the input, the technological field associated with the input, and the selection of the one or more suggested terms; and
   generating a capability score based at least on the identified documents and a user profile.

2. The method of claim 1, wherein the input is one of a text string, a portion of a document, or a complete document.

3. The method of claim 1, wherein the documents in the document database are associated with the user.

4. The method of claim 3, wherein the capability score is based at least on the number of technology elements identified in the documents that correspond to technology elements associated with the user profile.

5. The method of claim 3, wherein the capability score is further based on a uniqueness factor between identified documents associated with the user and identified documents not associated with the user.

6. The method of claim 1, further comprising: analyzing the documents in the document database to identity one or more problem kernels comprising the technology elements identified based on the input, the technological field associated with the input, and the selection of the one or more suggested terms.

7. The method of claim 1, further comprising:
displaying the identified documents at the user interface, wherein the identified documents are organized according to relevance of their technology elements.

8. The method of claim 1, further comprising: generating the suggested terms according to a priority weight.

9. The method of claim 1, further comprising: generating the suggested terms in view of excluded terms.

10. The method of claim 1, further comprising: generating a visualization related to the technical capability score of the user based on the identified documents.

11. The method of claim 10, wherein the visualization illustrates problem intensity.

12. The method of claim 1, further comprising: associating a technological field with the user based on a user profile.

13. The method of claim 1, further comprising:
receiving a selection of a document of the identified documents; and,
displaying the document at the user interface, including identified technological concepts associated with the document.

14. The method of claim 13, further comprising:
displaying one or more visualizations related to the selected document.

15. The method of claim 1, wherein the one or more suggested terms are mapped to a plurality of expressions based at least on common alternative expressions of the one or more suggested terms.

16. The method of claim 1, further comprising: upon receiving the selection of the one or more suggested terms, generating a secondary suggested term associated with the technological field.

17. The method of claim 1, wherein generating the technical capability score of the user is based on a uniqueness factor.

18. The method of claim 1, further comprising: generating a capability fit based on the one or more technology elements.

19. A computer implemented method for determining one or more technical opportunities, the method comprising:
receiving an input from a user via a user interface;
associating the input with a technological field;
generating one or more suggested terms associated with the technological field, wherein the one or more suggested terms are based on technological concepts related to the technological field;
displaying the one or more suggested terms at the user interface;
receiving a selection of the one or more suggested terms;
identifying documents in a document database with one or more problem kernels comprising a plurality of technology elements, wherein the technology elements are associated with a competitor of the user;
generating an opportunity score of the user based on the identified documents and associated technology elements.

* * * * *